US005627530A

United States Patent [19]

Israel et al.

[11] Patent Number: 5,627,530
[45] Date of Patent: May 6, 1997

[54] DEVICE OPERABLE AS A TDD AND A STANDARD COMPUTER KEYBOARD

[75] Inventors: Albert Israel, Montreal; Roger Lasry, Cote Saint Luc; Jean F. Larivee, Montreal, all of Canada

[73] Assignee: Positron Industries, Inc., Montreal, Canada

[21] Appl. No.: 958,099

[22] Filed: Oct. 7, 1992

[51] Int. Cl.$^6$ ................................................. H03K 17/94
[52] U.S. Cl. ............................. 341/21; 341/20; 341/22; 379/52; 400/83; 400/87
[58] Field of Search ................................. 379/52, 96–97, 379/86; 341/21, 22, 20; 340/825.19; 400/83, 87

[56] References Cited

U.S. PATENT DOCUMENTS

| | | | |
|---|---|---|---|
| 3,819,862 | 6/1974 | Hedges | 379/96 |
| 4,038,651 | 7/1977 | McGraw | 340/336 |
| 4,075,621 | 2/1978 | Salmon | 340/337 |
| 4,191,854 | 3/1980 | Coles | 379/96 |
| 4,268,721 | 5/1981 | Nielson et al. | 379/96 |
| 4,307,266 | 12/1981 | Messina | 379/96 |
| 4,394,649 | 7/1983 | Suchoff et al. | 340/711 |
| 4,442,318 | 4/1984 | Desrochers | 379/96 |
| 4,471,165 | 9/1984 | DeFino et al. | 379/96 |
| 4,503,288 | 3/1985 | Kessler | 379/96 |
| 4,608,457 | 8/1986 | Fowler et al. | 379/96 |
| 4,849,815 | 7/1989 | Streck | 379/100 |
| 5,065,425 | 11/1991 | Lecomte et al. | 379/93 |
| 5,081,673 | 1/1992 | Engelke et al. | 379/98 |
| 5,163,081 | 11/1992 | Wycherly et al. | 379/52 |
| 5,200,988 | 4/1993 | Riskin | 379/52 |
| 5,289,523 | 2/1994 | Vasile et al. | 379/52 |

OTHER PUBLICATIONS

User's Manual, Microflip Inc., FULLTALK Version 3.00, EASETALK Version 1.00, and FASTALK Version 1.00, copyright 1989.

Brochure for Superprint ES, dated Jun. 1991.

Brochure for Zetron Model 3030 PSAP Telecommunications Device for the Deaf, dated Aug. 1991.

Specification sheet for Zetron Model 3030 TDD PSAP TDD, dated Nov. 1991.

"Questions & Answers" brochure for Zetron Model 3030 TDD, Jan. 1992.

Promotional brochure for FULLTALK by Microflip Inc., undated.

Brochure for TDD Detector by Ultratec, undated.

Brochure for AT & T Portaview Jr., undated.

Brochure for AT & T VCT 1310 Plus video communications terminal, undated.

Brochure for MIC300i Modem, undated.

"Communication at its Best"; Microflip Inc.

*Primary Examiner*—John K. Peng
*Assistant Examiner*—Ashok Mannava
*Attorney, Agent, or Firm*—McAndrews, Held & Malloy, Ltd.

[57] ABSTRACT

A telecommunication device for the deaf includes a standard size computer keyboard and is operable to function either as a standard TDD or a standard computer input device. The device includes a housing with a computer keyboard having alpha, numeric and function keys mounted on the housing. A TDD communication interface receives telecommunications for the deaf from and transmits telecommunications for the deaf to a telephone line wherein the interface is mounted in the keyboard housing. A mode switch mounted on the housing is actuable to indicate operation of the device in one of a number of modes wherein a controller is responsive to the mode switch to echo keyboard inputs to either a first computer, a second computer or a TDD communication interface depending upon the mode of operation.

28 Claims, 28 Drawing Sheets

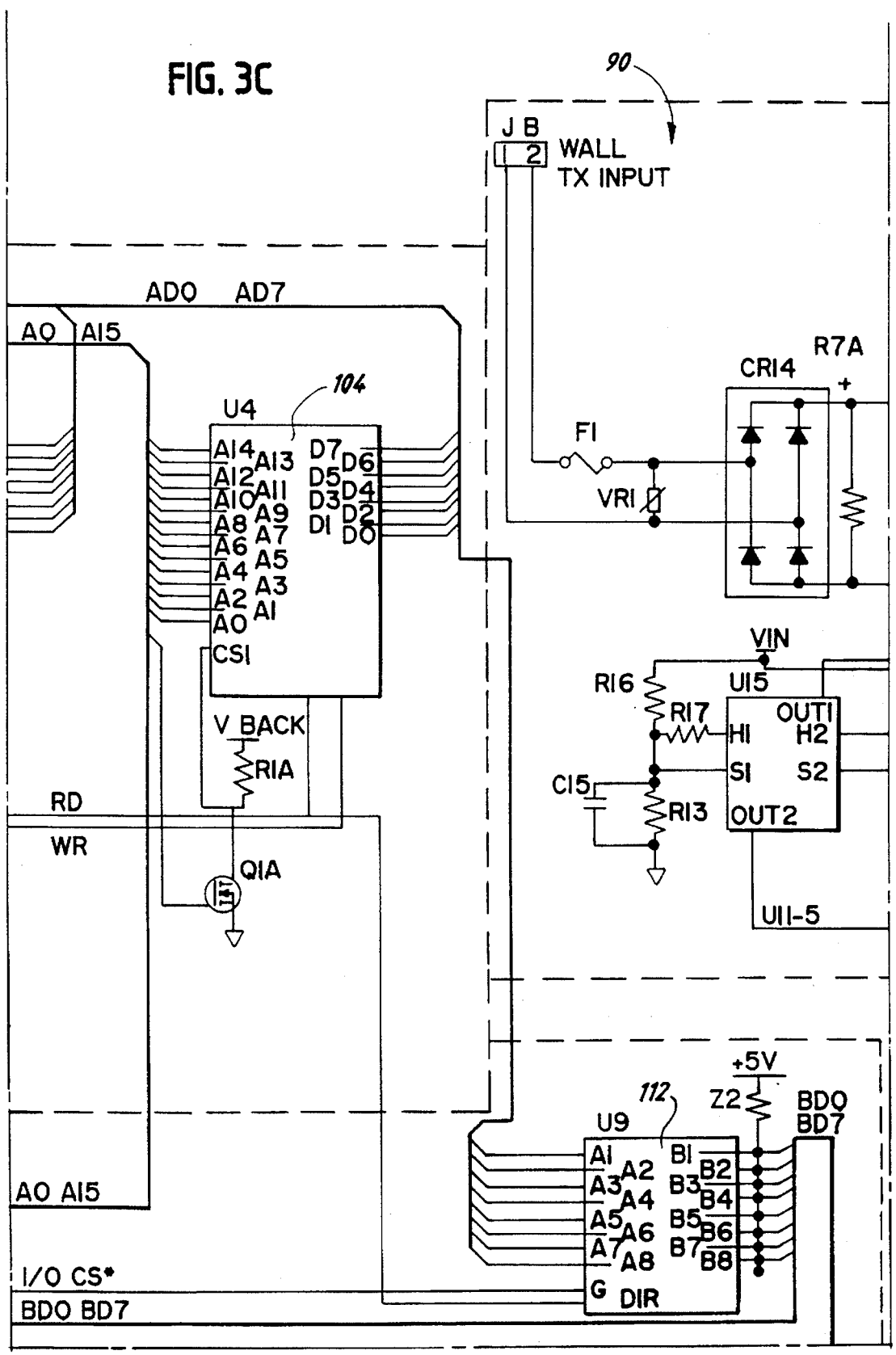

FIG. 4

| FIG. 4A | FIG. 4B | FIG. 4C | FIG. 4D |
|---|---|---|---|
| FIG. 4E | FIG. 4F | FIG. 4G | FIG. 4H |

DEVICE OPERABLE AS A TDD AND A STANDARD COMPUTER KEYBOARD

TECHNICAL FIELD

The present invention is directed to a telecommunication device for the deaf, TDD, and more particularly to such a device that includes a standard size computer keyboard, the device being operable in a number of modes to echo keyboard inputs to one of a number of computers and/or to a TDD communication interface for transmission via a telephone line.

BACKGROUND OF THE INVENTION

Known TDD's are used by operators to communicate with the deaf via standard telephone lines. Such known operator TDDs typically include a limited keyboard for sending TDD messages, a display for displaying incoming and outgoing messages and a printer that provides a hard copy record of TDD communications. The keyboards used for known TDDs are small, having closely spaced keys which make these devices difficult to use. Further known TDDs typically are not directly coupled to a telephone line. More particularly, these known TDDs use an acoustic coupler in which the handset of a telephone is placed, the coupler transmitting by sound the tones from the telephone handset to the TDD. Couplers, however cannot be used with telephone headsets. Further, if the shape of the acoustic coupler's rubber cup does not conform to the shape of the handset placed in the cup, data can be lost. Other expensive TDDs are known that are connected directly to the telephone line at the line's tip and ring connection. This connection can cause problems, however, when installed at a public safety answering point, PSAP, utilizing multiple telephone lines. At PSAP's the TDD operator typically uses a computer also. However, a fairly large work space is required to accommodate the TDD, the computer and the computer keyboard.

TDD products are also known that are resident in a computer requiring resident software. However, software compatibility problems can arise with other software application programs run on the computer.

SUMMARY OF THE INVENTION

In accordance with the present invention, the disadvantages of prior TDDs have been overcome. The TDD of the present invention includes a standard size computer keyboard wherein the device is operable in a number of modes to echo keyboard inputs to one of a number of computers and/or to a TDD communication interface for transmission via a telephone line.

More particularly, the present invention includes a housing and a computer keyboard having alpha, numeric and function keys mounted on the housing. A TDD communication interface receives telecommunications for the deaf from and transmits telecommunications for the deaf to a telephone line wherein the interface is mounted in the keyboard housing. A mode switch is also mounted on the keyboard housing. The mode switch is actuable to indicate operation of the device in one of a number of modes. A controller contained within the keyboard housing is responsive to a mode switch indication of a first mode of operation to couple keyboard inputs to the TDD communication interface. In a second mode of operation as indicated by the mode switch, the controller couples keyboard inputs to a first computer so as to allow the single device to form both a TDD and a computer keyboard. The device may also be coupled to a second computer and operable in a third mode to couple keyboard inputs to the second computer. Further, combination TDD and computer modes may be provided wherein the keyboard inputs are coupled to both the TDD communication interface and either the first computer or the second computer. Because the TDD can function alternately as a standard computer keyboard or a conventional TDD, it can be accommodated in a limited work space and further eliminates clutter.

The TDD of the present invention automatically detects the receipt of a telecommunication from the deaf and includes various means to provide an indication to a user that a telecommunication from the deaf has been received regardless of the mode of operation of the device. The indicating means may include a display to provide a visual indication and/or a buzzer or the like to provide an audible indication.

The TDD device of the present invention is coupled to a mouthpiece and earpiece connection of a telephone handset and telephone base so that the TDD is not directly connected to a telephone line at the tip and ring connection. Thus the problems associated with tip and ring TDD connections are overcome. In order to accommodate various telephones, the device includes an adjustable gain for the mouthpiece connection. This insures that TDD signals are transmitted at the proper signal strength. Further, the controller automatically disconnects the telephone's mouthpiece connection during a TDD transmission so that any noise picked up by the mouthpiece of the telephone does not interfere with a TDD transmission. Upon receipt of a TDD communication, the controller also automatically attenuates the level of an incoming signal on the earpiece connection to attenuate the TDD communication heard by a TDD operator.

In order to allow the device of the present invention to be operated as a standard computer keyboard when power to the device's controller is down, the keyboard is powered by the computer's power supply. A bypass circuit is provided to allow the mode switch to control which of the first or second computers is coupled to the keyboard when the controller is down. Thus inoperability of the TDD communication portion of the device during a power failure does not affect the device's ability to function as a standard computer keyboard.

These and other objects, advantages and novel features of the present invention as well as details of an illustrated embodiment thereof will be more fully understood from the following description and the drawing.

BRIEF DESCRIPTION OF THE DRAWING

FIGS. 3A-3G, 4A-4H and 5A-5H form a schematic diagram of the TDD device illustrated in FIG. 2;

FIG. 4 is a plan view illustrating the interconnection of FIGS. 4A-4H; and

DESCRIPTION OF THE PREFERRED EMBODIMENT

Figure 1:
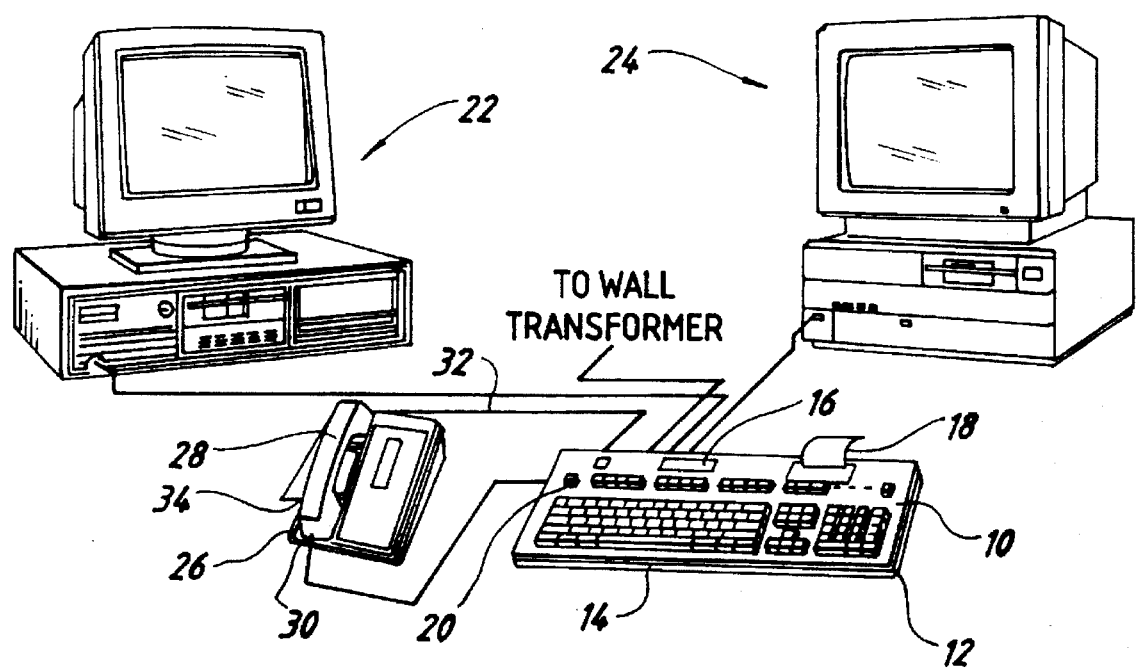
FIG. 1 is a perspective view of the TDD of the present invention coupled to a pair of personal computers and to a telephone.

The telecommunication device for the deaf, TDD 10, of the present invention includes a housing 12 having a keyboard 14, an LCD display 16 and a printer 18. The keyboard 14 is a standard size computer keyboard having alpha, numeric and function keys such as F1–F12, a Shift key, a Control key, etc. The keyboard also includes a mode key 20 the actuation of which determines the mode of operation of the TDD device 10. In a first mode, the keyboard 14 is dedicated to TDD communications. In a second mode of operation the keyboard is dedicated to communications with a first personal computer 22. In a third mode the keyboard 14 is dedicated to communications with a second personal computer 24. In a respective fourth and fifth mode, the keyboard inputs may be coupled to the respective computers 22 and 24 as well as to provide TDD communications. The TDD 10 is coupled to a telephone 26 to receive and transmit TDD communications across a telephone line via the telephone 26. More particularly, the TDD is coupled to the handset 28 of the telephone 26 via a connection 30, the TDD 10 also being connected via a line 32 to the base 34 of the telephone 26.

Figure 2:
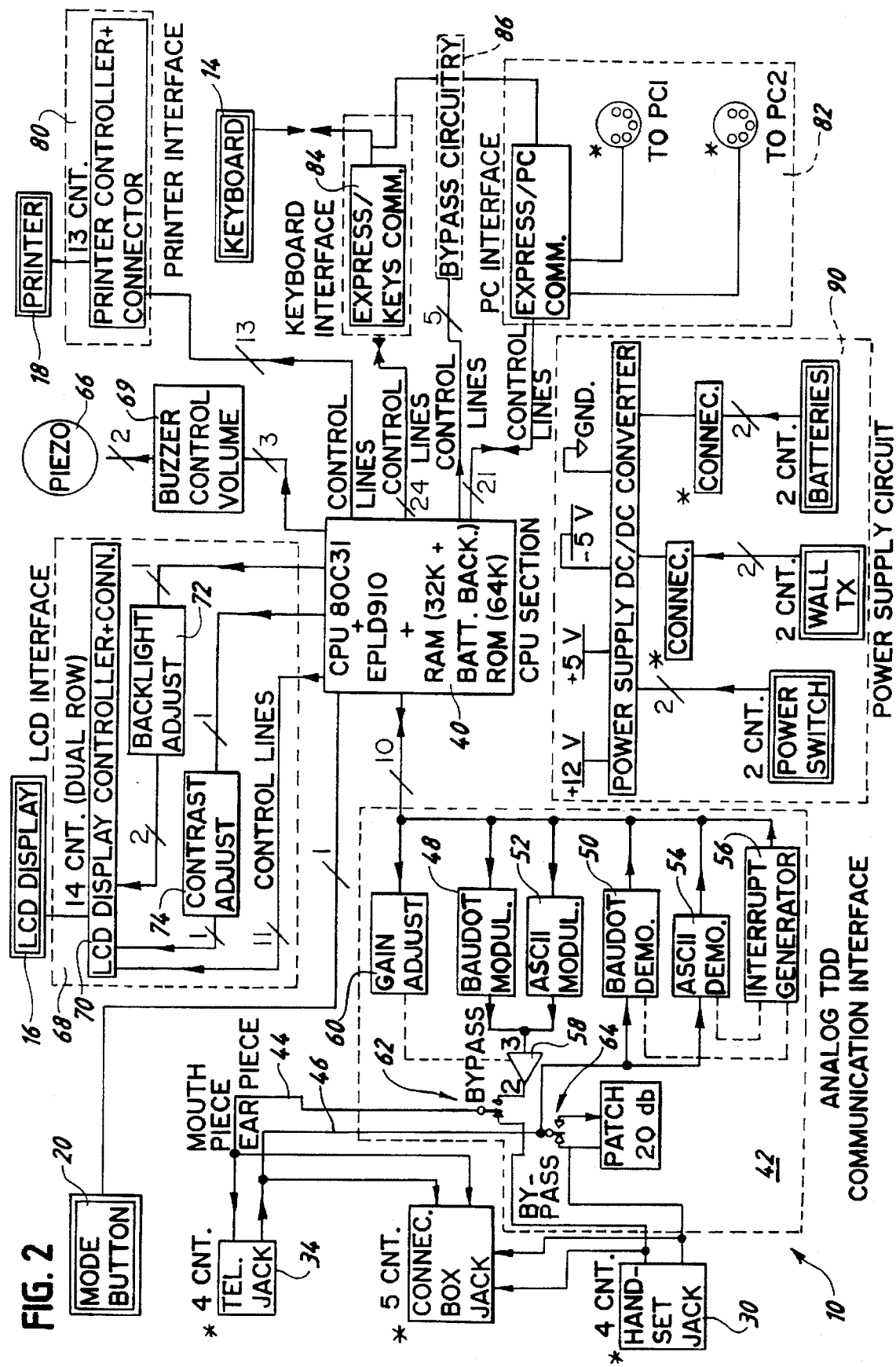
FIG. 2 is a block diagram of the TDD device of the present invention.

As shown in FIG. 2, the TDD 10 includes a controller 40 having an 80C31 CPU that operates in accordance with software stored in a 64K ROM. The controller 40 includes 32K of RAM, the RAM being battery backed up and storing programmable messages, prompts and settings when the power switch of the unit 10 is off or when the unit 10 is not powered. The controller 40 stores in the nonvolatile RAM a number of preprogrammed messages that are utilized for TDD communications wherein each message may be sent in response to the actuation of one or a combination of function keys. A programmable logic array EPLD 910 is included in the controller for address decoding to generate necessary chip selects for the device's circuitry as will be apparent from the schematics of the device 10 depicted in FIGS. 3–25.

The controller 40 couples the preprogrammed messages or user actuated keyboard messages to a mouthpiece connection 44 of the telephone 26 via an analog TDD communication interface 42. Similarly, the controller 40 receives TDD messages from an earpiece connection 46 of the telephone 26 via the communication interface 42. The TDD communications received and transmitted may have Baudot protocol or an ASCII protocol. A Baudot modulator 48 is utilized to transmit Baudot TDD communications and a Baudot demodulator 50 is utilized to receive and detect Baudot TDD communications. Similarly, an ASCII modulator 52 is utilized to transmit ASCII TDD communications whereas an ASCII demodulator 54 is utilized to receive and detect ASCII TDD communications. An amplifier 58 having a gain adjustment 60 is disposed in the path of the mouthpiece connection 44 so that upon installation of the device, the gain for the transmission of TDD communications can be adjusted. This feature allows the gain of the device to provide a TDD signal of the requisite strength regardless of the particular telephone 26 utilized. More particularly, upon installation, the gain 60 is dynamically adjusted by software over a total range of 48 dB so as to maintain a signal of minus 9 dB on the tip and ring connection of the telephone 26. TDD calls are automatically detected by the Baudot demodulator 50 and the ASCII demodulator 54. More particularly, upon detection of a valid Baudot TDD communication, the Baudot demodulator 50 generates a detect signal that is coupled to an interrupt generator 56.

Similarly, upon receipt of a valid ASCII TDD call, the ASCII demodulator 54 provides a detect signal to the interrupt generator 56. In response to either a detect signal from either the Baudot or ASCII demodulator, the interrupt generator 56 generates an interrupt that is coupled to the controller 40. Further, a pair of bypass relays 62 and 64 disposed within the paths of the mouthpiece connection 44 and earpiece connection 46 respectively allow the telephone 26 to be operated normally without interference from the TDD 10.

The controller 40 is responsive to an interrupt signaling the detection of a valid TDD call by providing a visual indication as well as an audible indication to the user utilizing the display 16 and a buzzer 66 respectively. The controller 40 is coupled to the LCD display 16 via an LCD interface 68 that includes an LCD display controller 70 with back light adjustment 72 and contrast adjustment 74. The LCD display is used to display the mode of operation, outgoing TDD messages and incoming TDD messages. The LCD 16 also provides a "battery on" indication when the device's battery is being utilized, a low battery voltage indication also being provided on the display 16 when a low battery voltage is detected. The buzzer which may be formed of a piezoelectric transducer 66 is coupled to the controller 40 via a buzzer volume control 69. The buzzer 66 is actuated to alert a TDD operator to an incoming TDD call. Upon receipt of a TDD call, the controller 40 utilizes the printer 18 to provide a date and time stamp on a hard copy record. Thereafter, incoming text is automatically printed with upper case characters; whereas outgoing text is printed utilizing lower case characters.

The keyboard 14 is coupled to the controller 40 through a keyboard interface 84 wherein the keyboard interface reads the keys actuated on the keyboard and provides the data to the controller 40. The controller 40 is coupled to the personal computers 22 and 24 via a P.C. interface 82. A bypass circuit 86 is coupled between the keyboard 14 and the P.C. interface 82 so as to permit the keyboard 14 to communicate directly with either one of the personal computers 22 or 24 if the controller 40 is down, the keyboard 14 being powered directly by the P.C.'s power supply. Further, when the controller 40 is down, a user can still utilize the mode switch 20 to change which of the P.C.'s 22 or 24 is coupled to the keyboard 14 as will be described in detail below. These features allow the keyboard 14 to function as a standard P.C. keyboard even if the controller 40 and TDD communications are down.

The controller 40 is coupled to the mode switch 20 to determine whether inputs from the keyboard 14 should be coupled to only the TDD communication interface 42, to only the first P.C. 22, to only the second P.C. 24 or to both the TDD communication interface 42 and one or the other of the P.C.'s 22 and 24. It is noted that regardless of the mode of operation, incoming TDD calls are always automatically detected and a visual and/or audible indication provided to the user.

Figure 3:
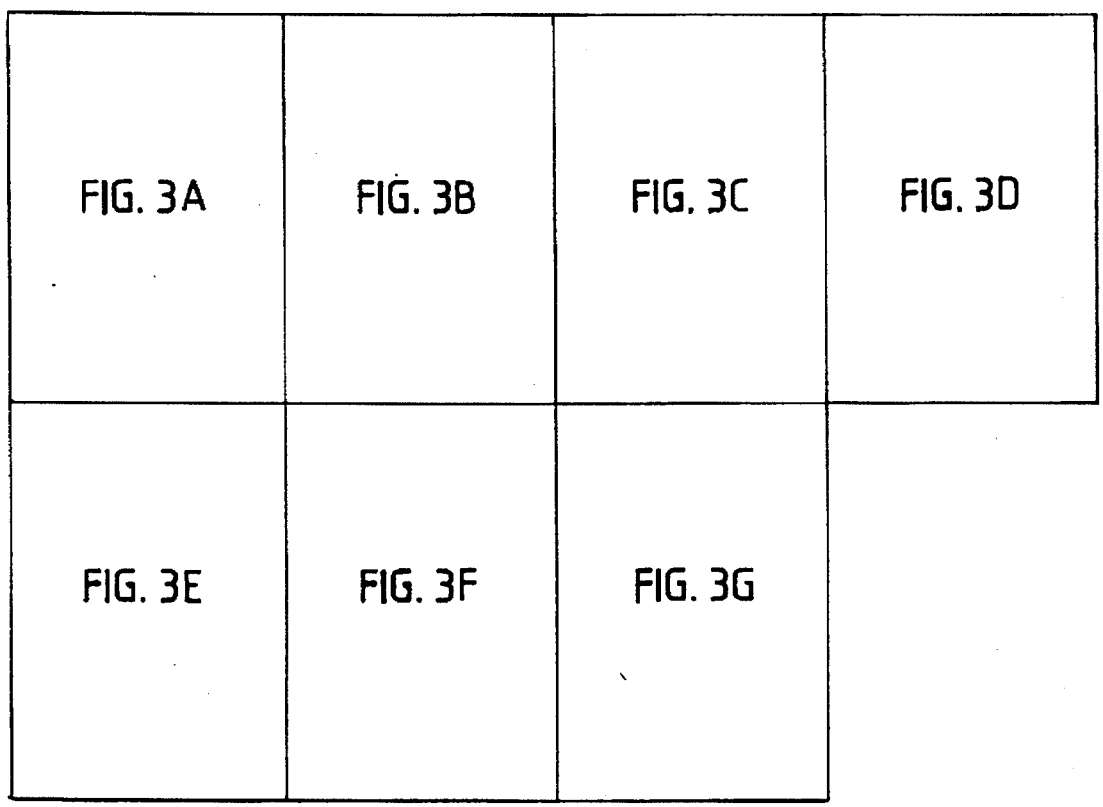
FIG. 3 is a plan view illustrating the interconnection of FIGS. 3A-3G.
Figure 3A:
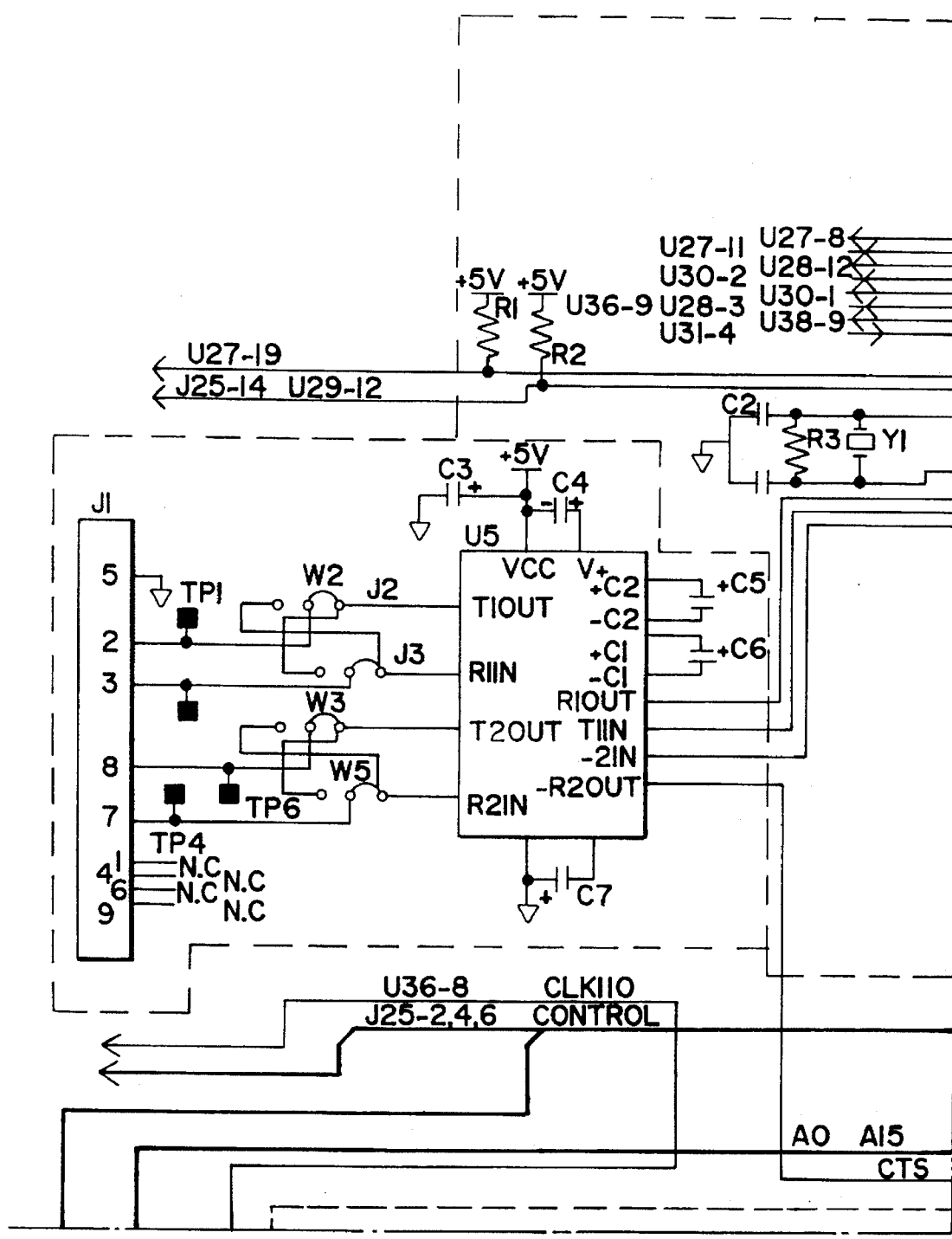
Figure 3B:
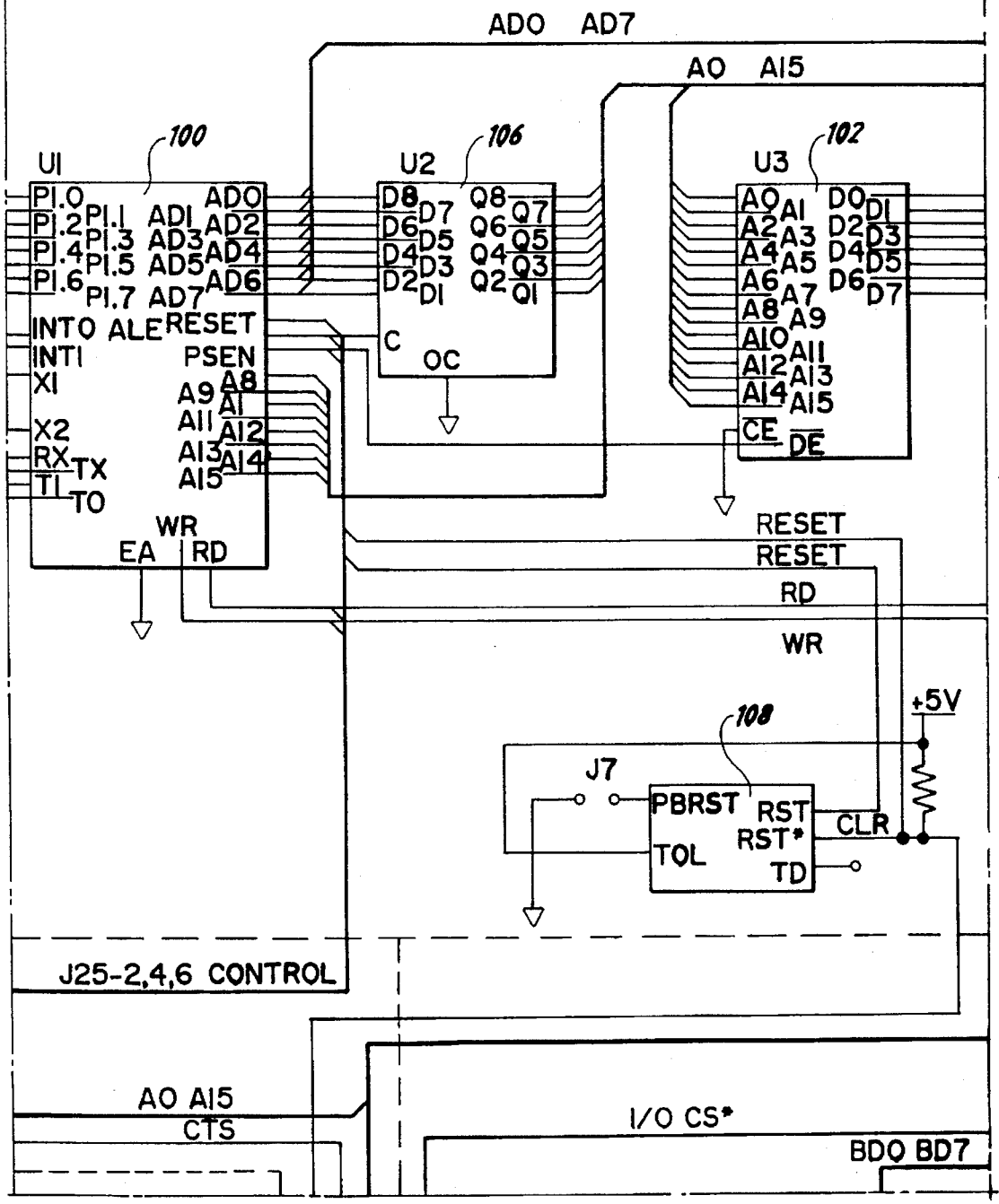
Figure 3D:
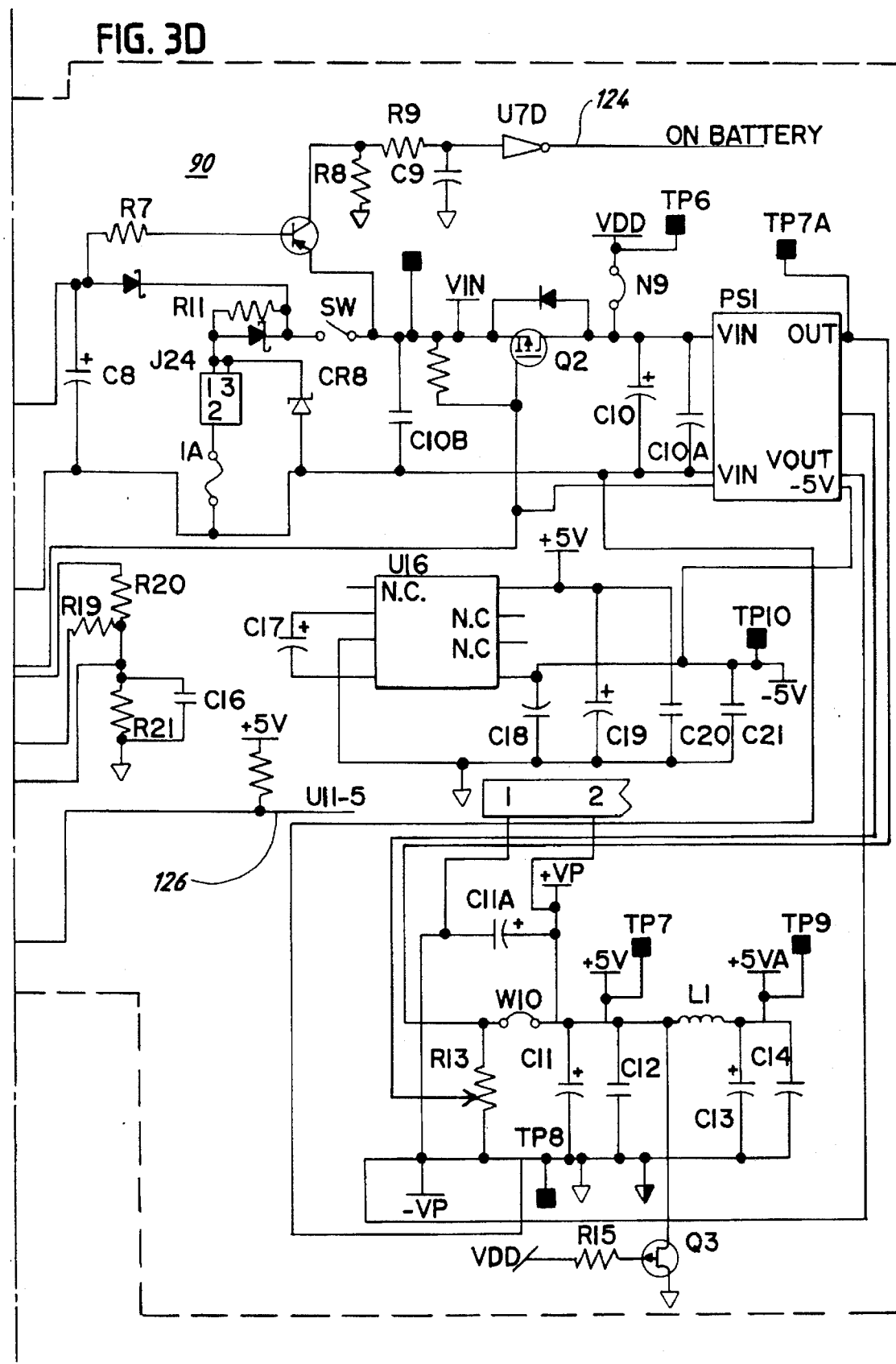
Figure 3E:
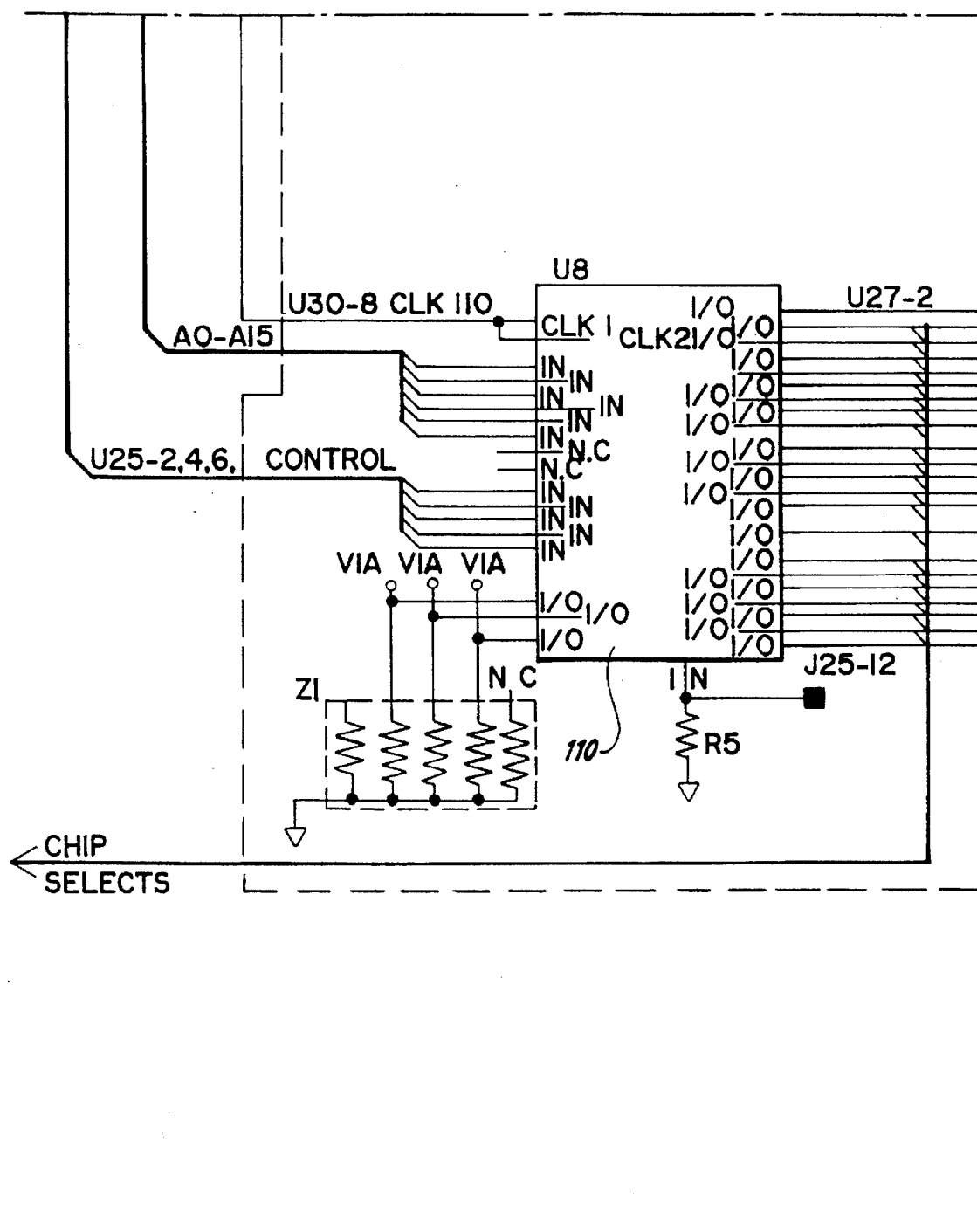
Figure 3F:
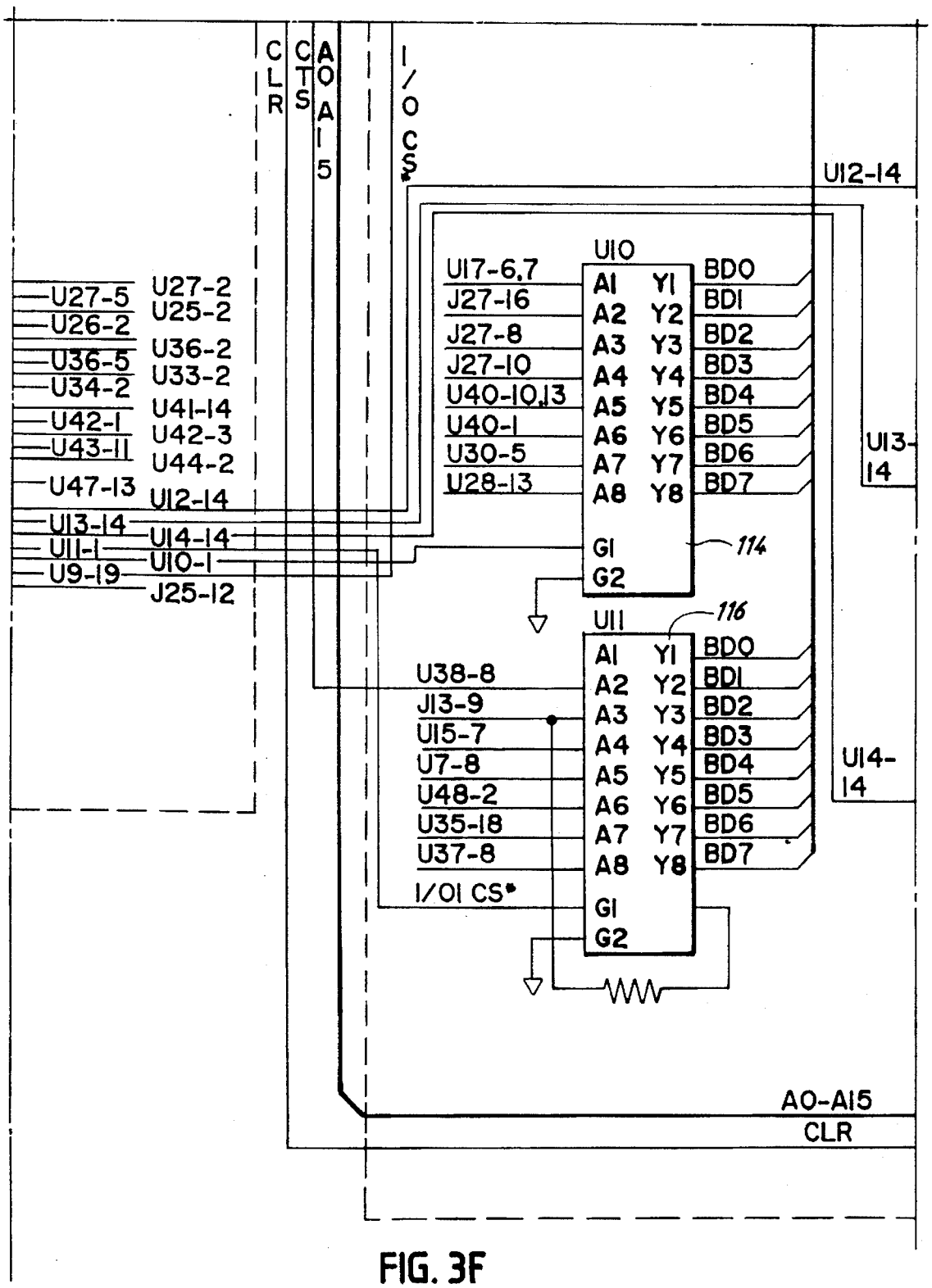
Figure 3G:
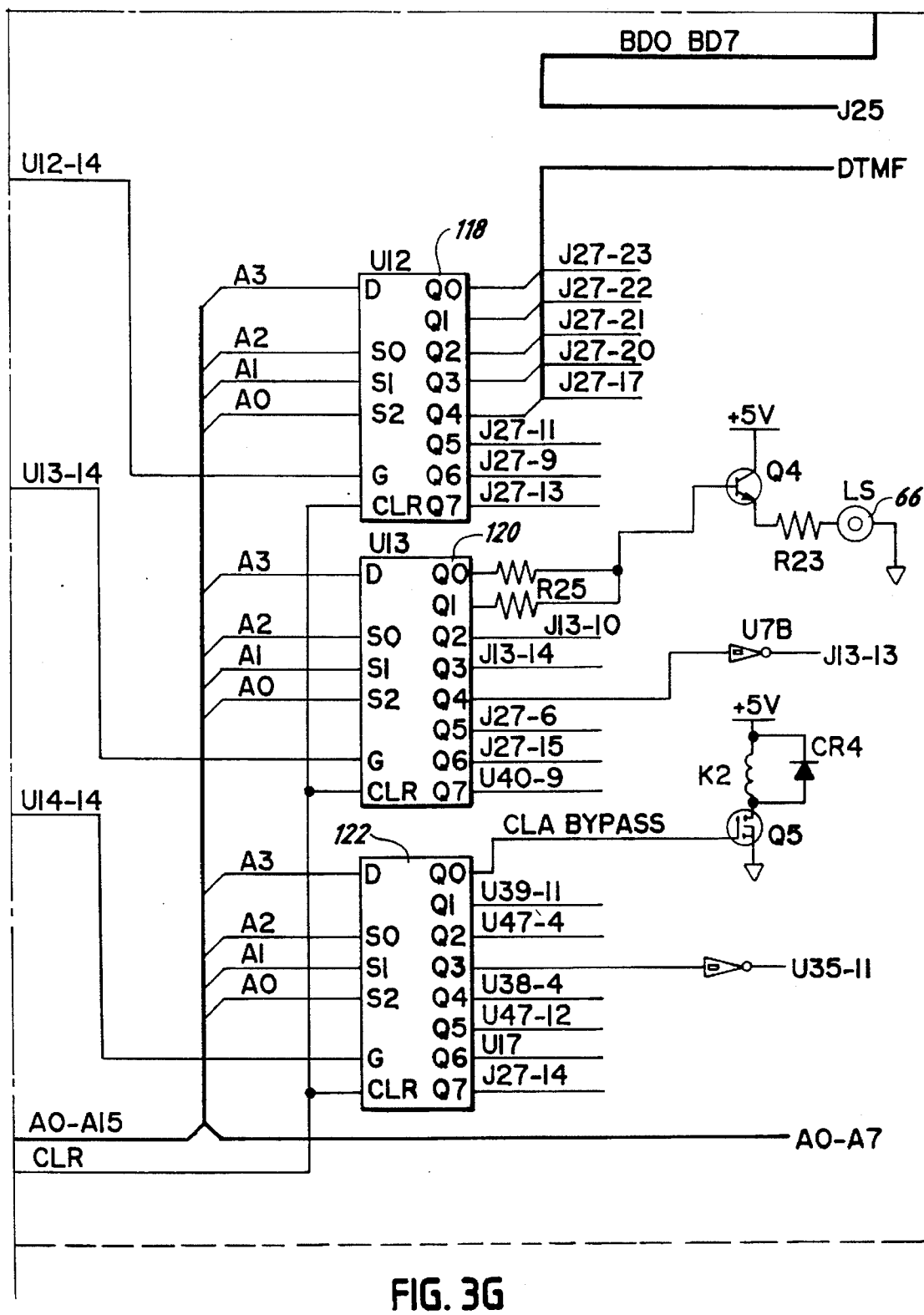

The CPU section of the controller 40 is illustrated in FIGS. 3A–3C. The CPU section includes a microcontroller 100 that is coupled to an EPROM 102 and a battery backed up RAM 104 via an address latch 106. The RAM 104 stores 30 preprogrammed TDD messages which are selectively sent by the microcontroller 100 to the TDD communication interface 42 for transmission via the telephone line in response to the actuation of one or more associated keys of the keyboard 14. More particularly, function keys F1–F10 are associated with respective messages 1–10; the two key combinations, Shift key, F1–Shift key, F10 are associated with respective messages 11–20 and the two key combination of Control key, F1–Control key, F10 are respectively associated with messages 21–30. The CPU section also includes a watch dog timer 108 that is coupled to a RESET port of the microcontroller 100. A programmable logic array chip 110 is utilized for address decoding to generate various chip select signals for the various devices utilized, including the data buffers 112 (FIG. 3C), 114 and 116 (FIG. 3F). The programmable logic array 110 also provides the chip select inputs for the bit addressable latches 118, 120 and 122 shown in FIG. 3G. The power supply 90 is shown in detail in FIG. 3C and FIG. 3D. The power supply 90 provides +12 volts DC at 100 ma; +5 volts DC at 2A; and −5 volts DC at 40 mA. The power supply also provides a "battery on" signal on a line 124 so that an indication that the device is being powered by batteries can be provided to the user via the LCD display 16. Further, on line 126 of the power supply 90 a signal is provided indicating that power supply voltage is going down below a predetermined level so that a low battery voltage warning can be provided to the user via the LCD display 16. An optional battery back up can be connected to a connector J4 (FIG. 3D) to ensure thirty minutes of Express functionality in the absence of A.C. power from power supply 90.

FIGS. 10–15 illustrate the circuitry of the TDD communication interface 42 and the connections thereof to the handset jack 30 and the jack on the base of the telephone 34. TDD signals received from the earpiece via lines 130 and 132 of the telephone jack 34 are coupled to a transformer 134 that is used for isolation and to provide common mode rejection for signals higher than 80 dB. The incoming signals picked up by the earpiece lines provide a "tone-in" signal on a line 136 that is coupled to the input of a Baudot demodulator 140 at the port labeled IN. The tone-in signal on line 136 is further coupled to an ASCII transceiver 142 at the input labeled RXA2. If the Baudot demodulator 140 detects a signal on line 136 of a Baudot frequency, the Baudot demodulator 140 outputs an active low detect Baudot signal on a line 146 that is coupled to the input of a NOR gate 148 of the interrupt generator 56. The Baudot demodulator also provides a signal RXD BAU on line 154 if a valid TDD Baudot call is received, the RXD BAU signal on line 154 being coupled to the NOR gate 148. Similarly, when the ASCII transceiver 142 detects a tone-in signal at the input port RXA2 within an ASCII frequency, the transceiver 142 outputs an active low detect ASCII signal on a line 150 that is coupled to the input of a NOR gate 152. If the ASCII transceiver 142 detects a valid ASCII TDD call, the transceiver 142 provides a signal on line 156, RXD ASCII, indicative thereof, this signal being coupled to the other input of the NOR gate 152. The outputs of NOR gates 148 and 152 are coupled to the inputs of a NOR gate 160, the output of which on a line 162 is an interrupt that is coupled to the controller 40 to indicate that a valid TDD communication has been received.

Figure 4A:
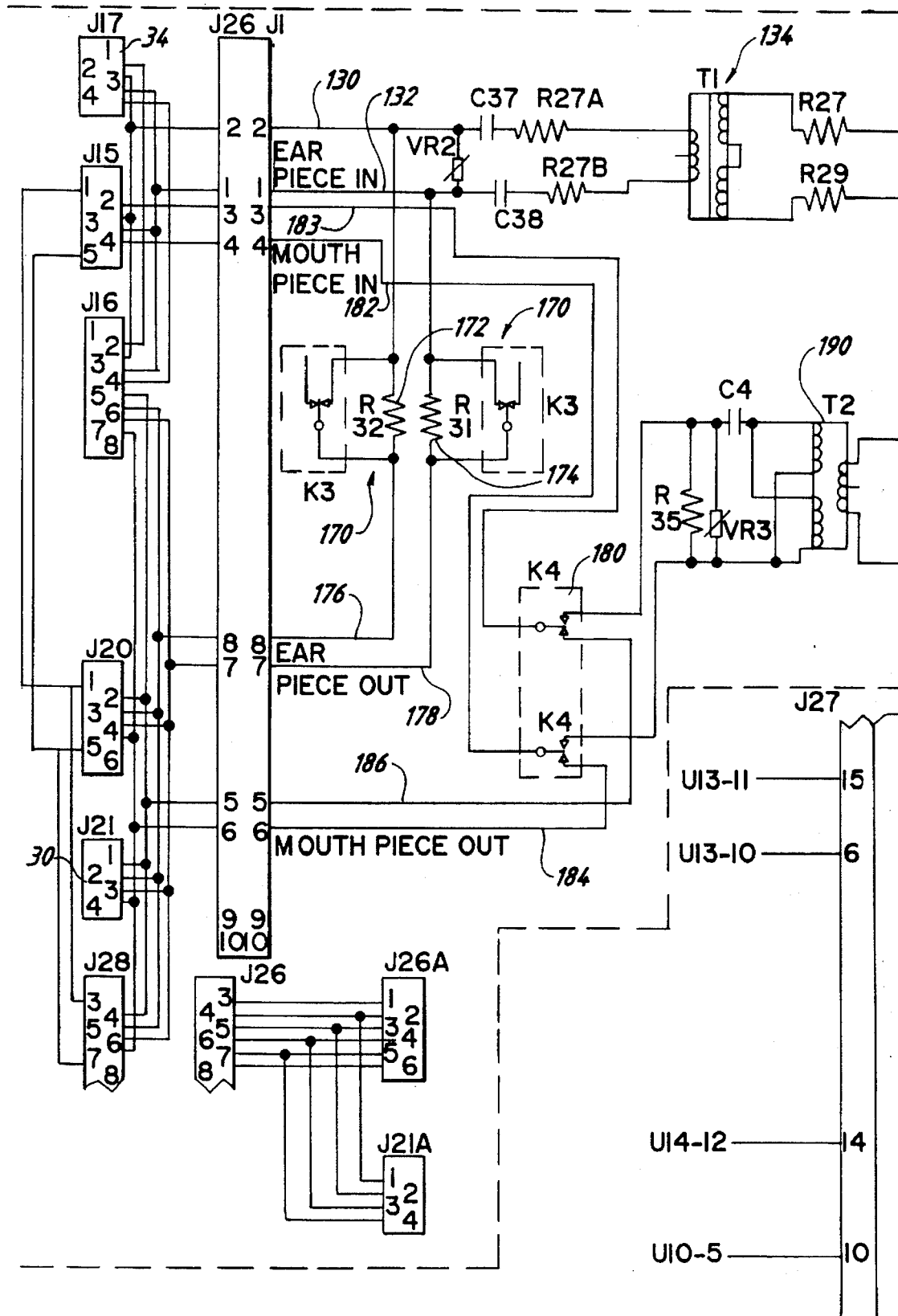
Figure 4B:
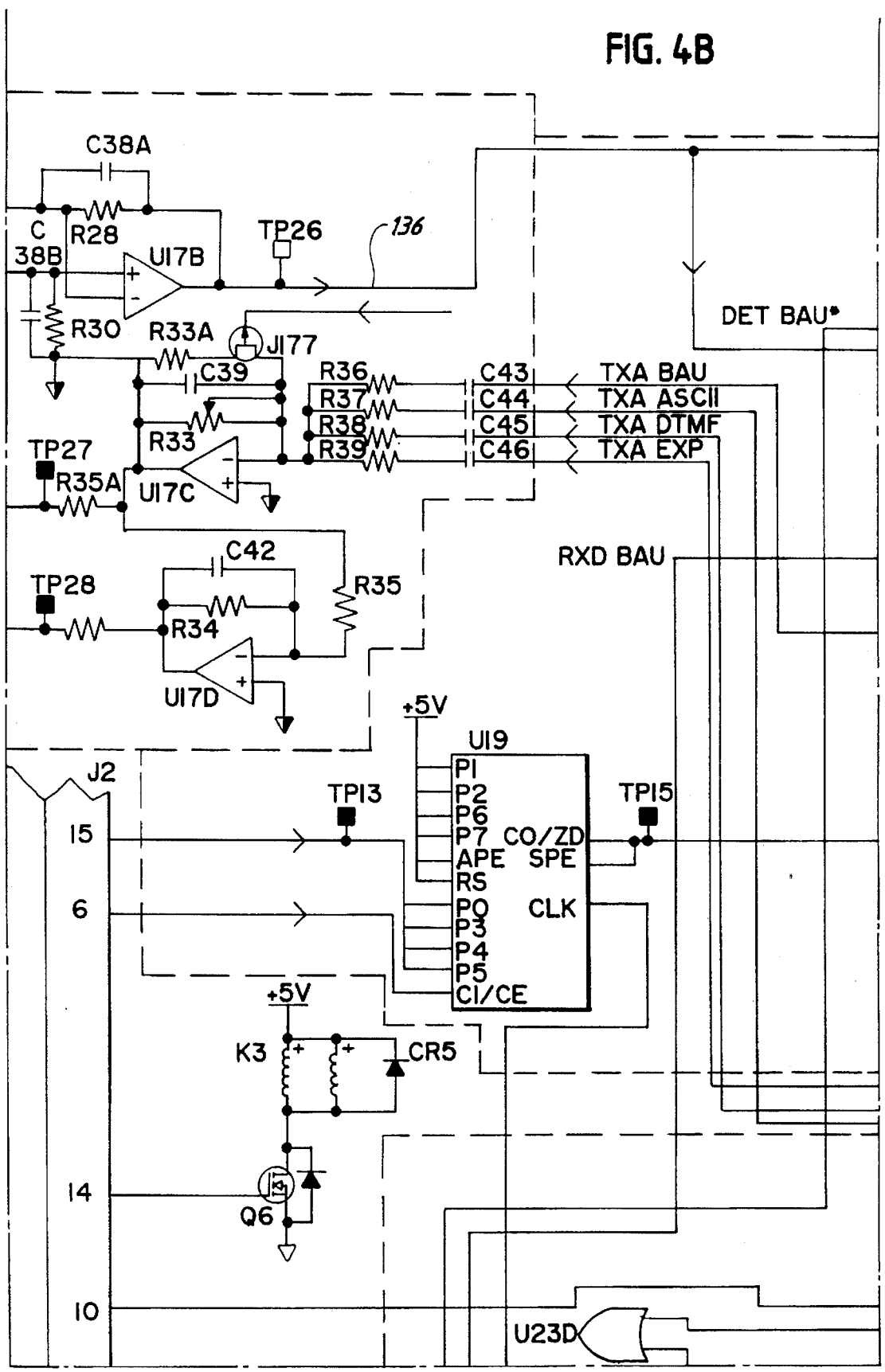
Figure 4C:
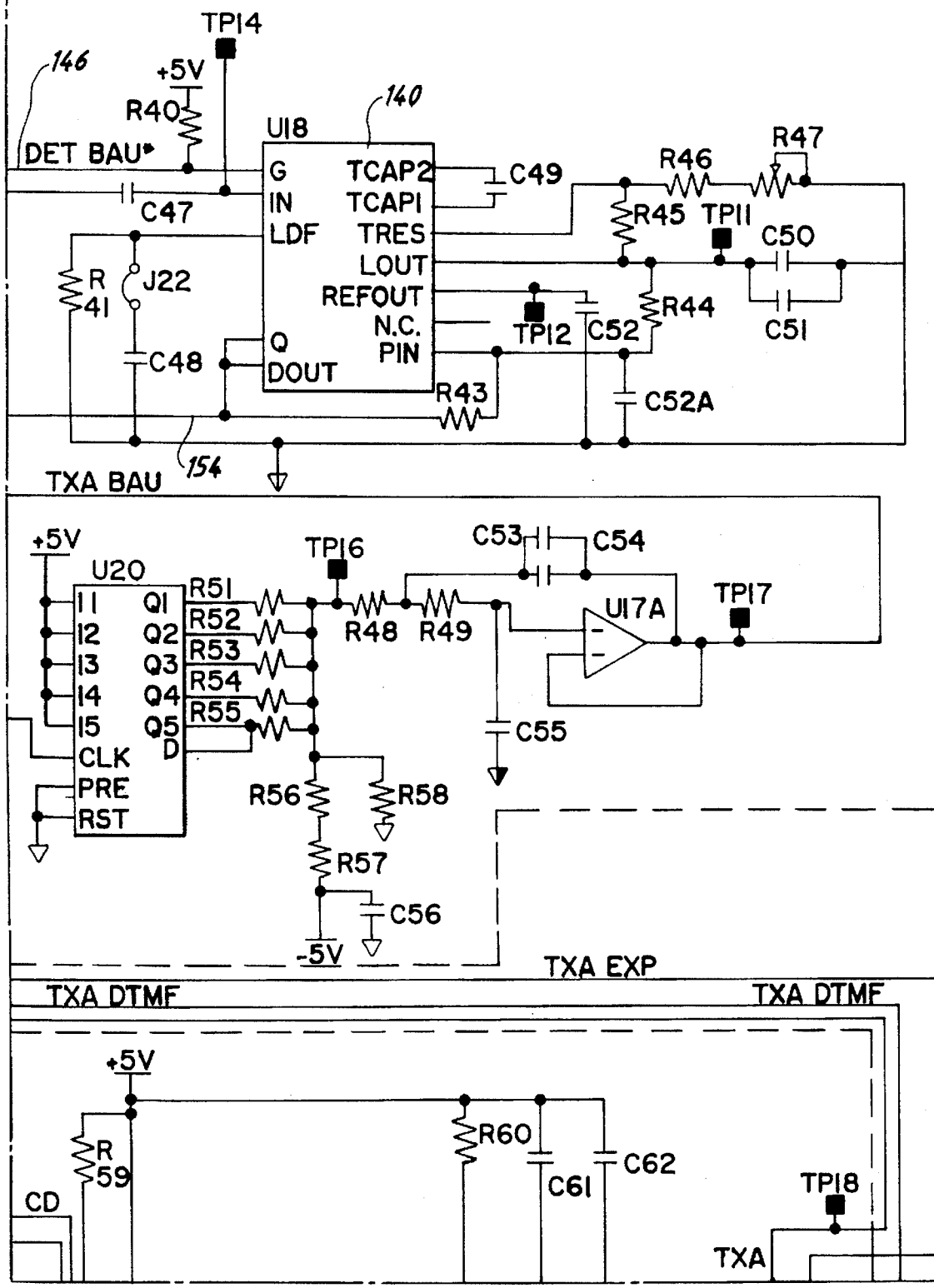
Figure 4D:
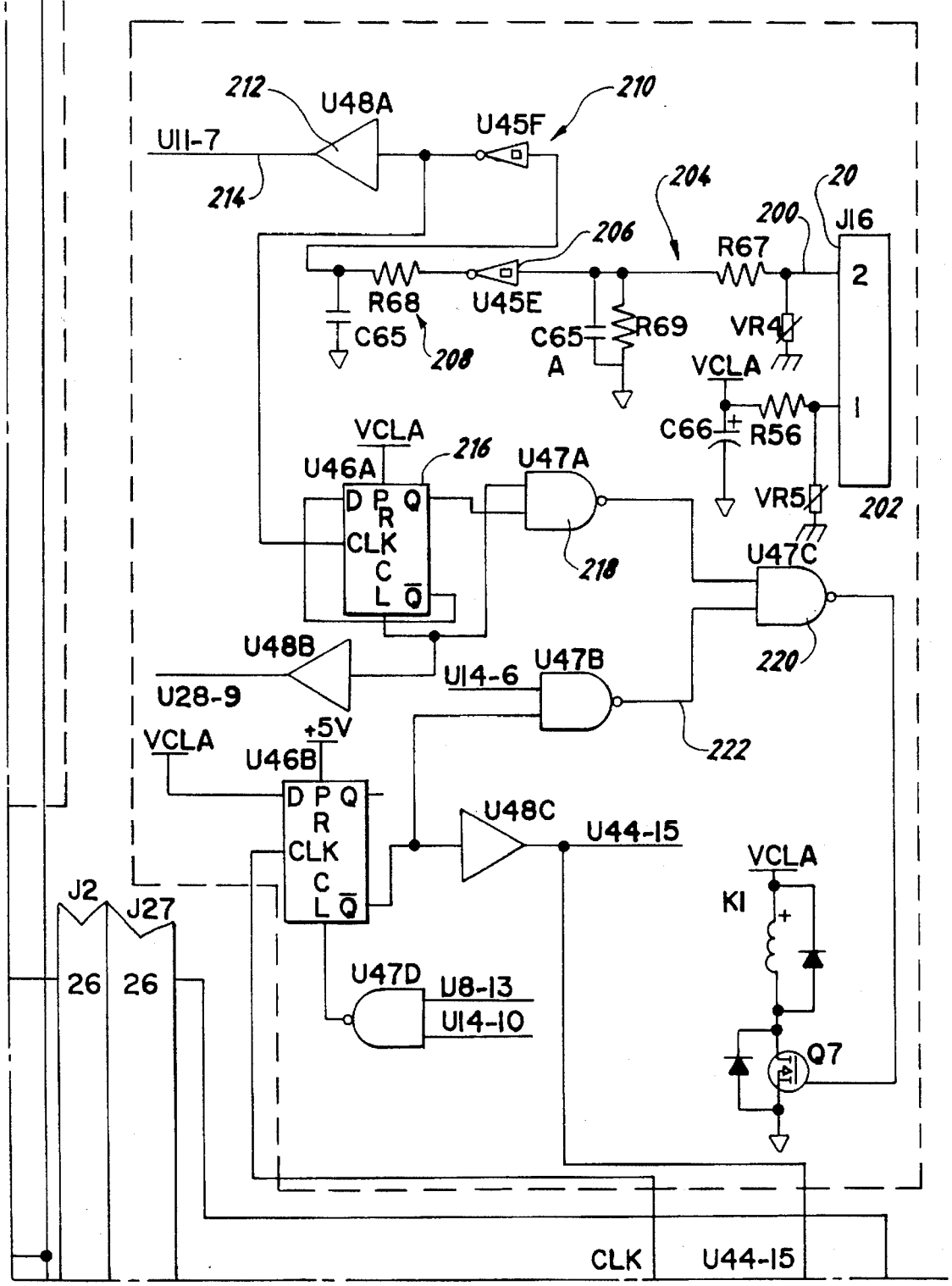
Figure 4E:
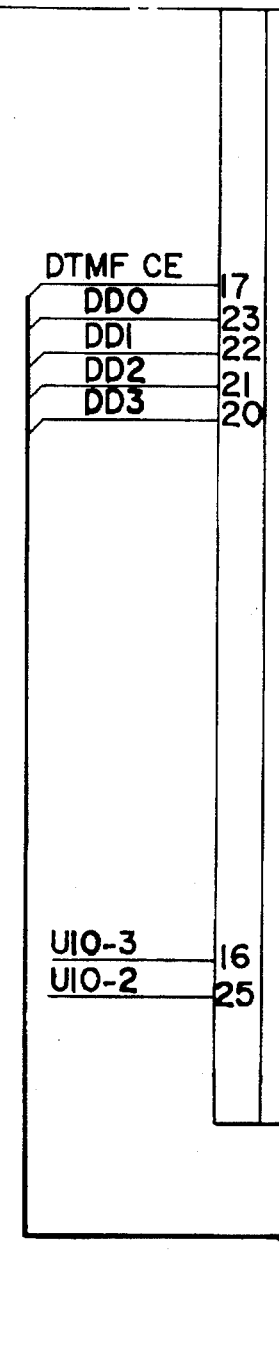
Figure 4F:
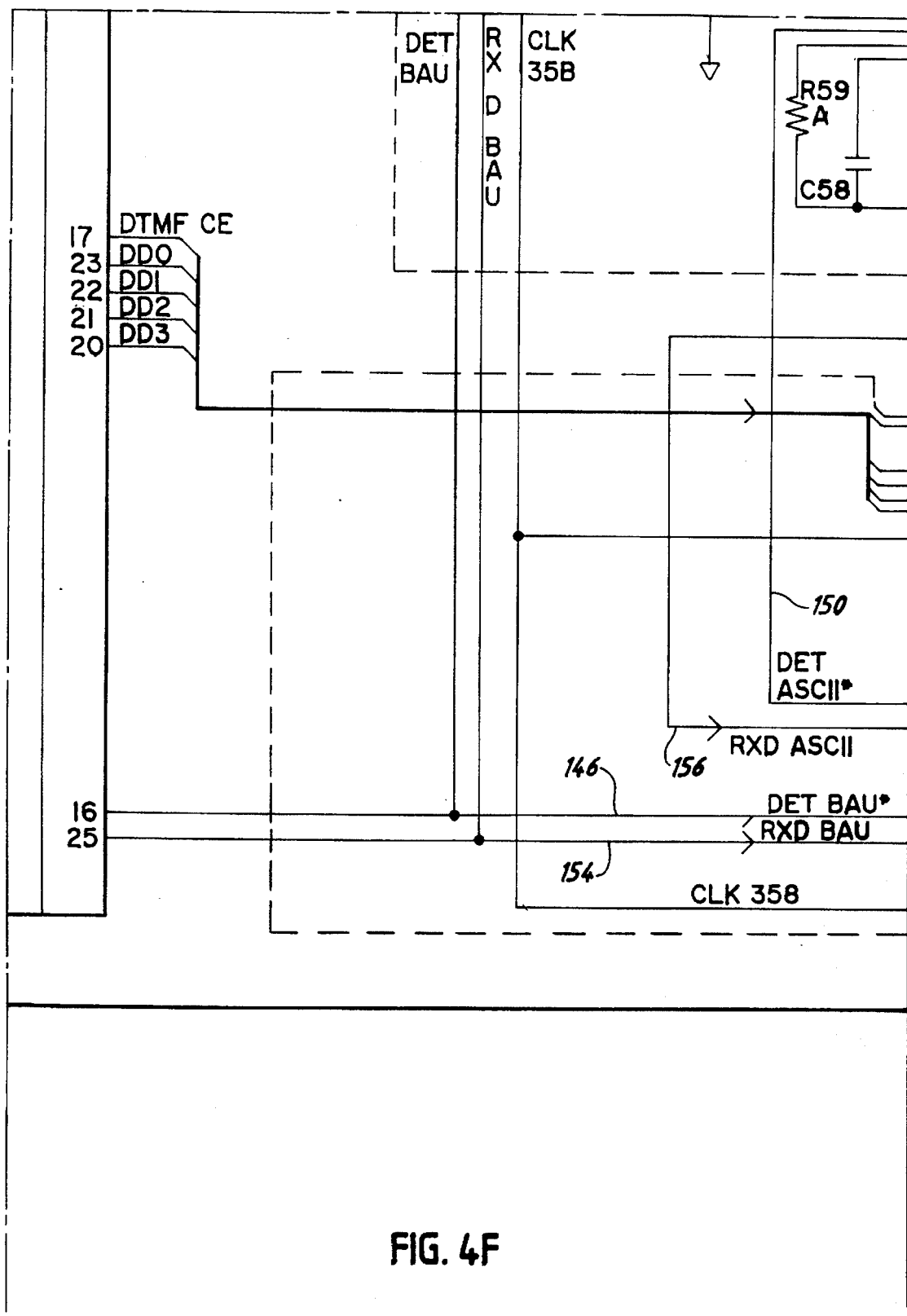

A relay 170 shown in FIG. 4A is coupled across resistors 172 and 174 disposed between the earpiece in connections 130, 132 and the earpiece out connections 176 and 178. The contacts of the relay 170 are normally in the closed positions so that the resistors 172 and 174 are bypassed. However, during TDD communications wherein TDD signals are being picked up by the earpiece, the contacts of the relay 170 are opened so that the resistors 172 and 174 attenuate the incoming signal. This reduces the volume of the signal heard by the TDD operator.

Outgoing Baudot TDD communications and ASCII TDD communications are coupled from the respective Baudot modulator 140 and the ASCII transceiver 142 through a transformer 190 to the mouthpiece connections 183 and 182 when a relay 180 is actuated. The relay 180 when actuated disconnects the mouthpiece out connections 184 and 186 during TDD transmissions out so that the TDD operators voice or other noise is not picked up via the mouthpiece of the telephone. This feature prevents such noise from interfering with the TDD signals being transmitted via the telephone 26.

Figure 4G:
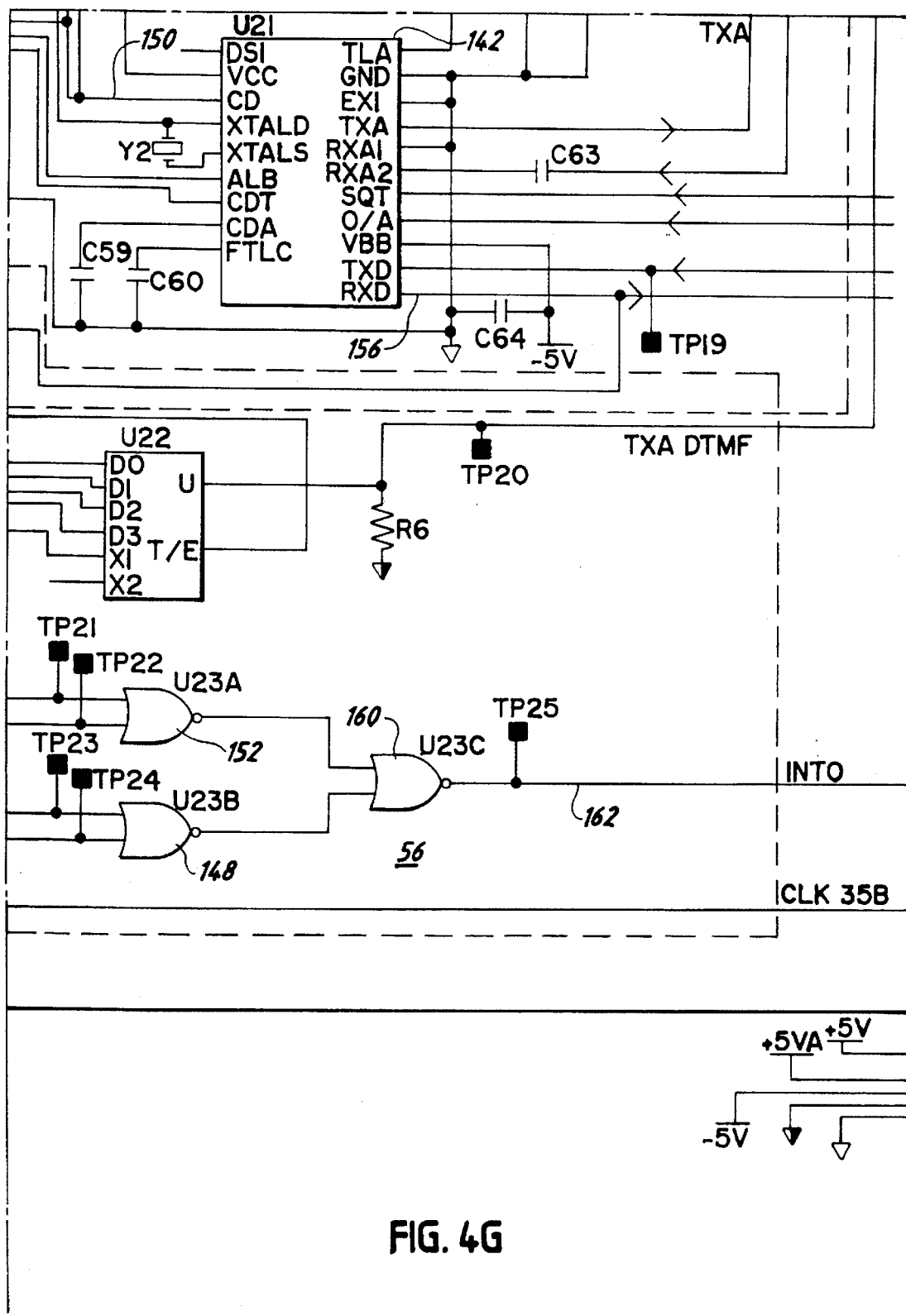
Figure 4H:
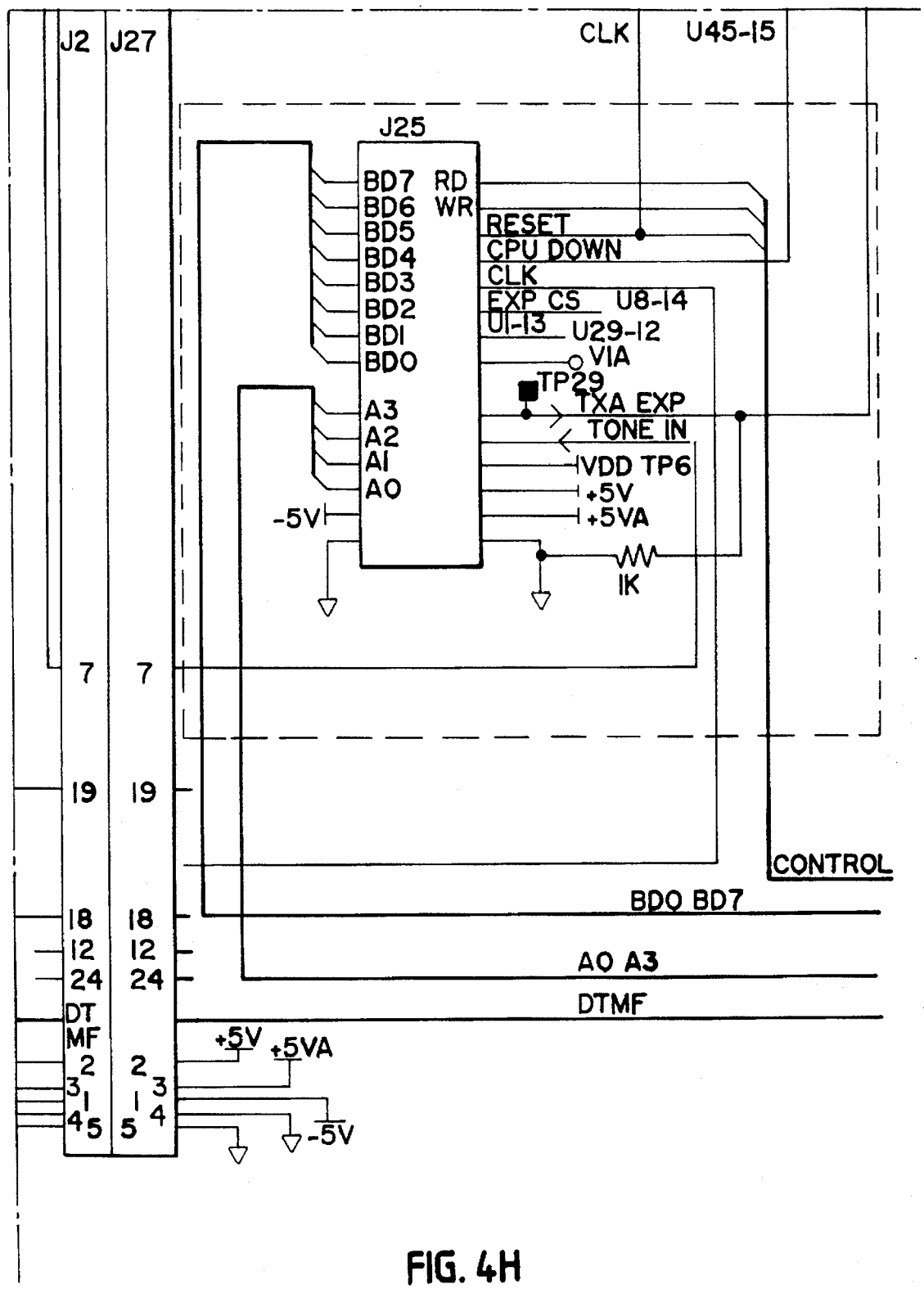

FIGS. 4G and 4H illustrate the mode switch 20 and the bypass circuitry 86. When the mode switch 20 is actuated, lines 200 and 202 are shorted so as to couple VCLA from a P.C. power supply to a filter 204. The filtered signal is then applied to an inverter 206 the output of which is applied to a filter 208. The output of the filter 208 is again inverted by an inverter 210 the output of which is coupled to the controller 40 via a buffer 212. The microcontroller 100 is responsive to transitions on the line 214 to change the mode of operation from the TDD mode to the first PC, 22 mode to the second PC, 24 mode, etc. The output of the inverter 210 is also applied to the clock input of a flip flop 216. Upon every actuation of the switch 20, the Q output of the flip flop 216 changes state. The Q output of the flip flop 26 is applied to the input of a NAND gate 218 the output of which is applied to a NAND gate 220. The other input of the NAND gate 220 is always a 1 when the microcontroller 100 is down so that the state of the relay K1 changes in response to each actuation of the mode switch 20. The relay K1 controls whether the first P.C. 22 or the second P.C. 24 is coupled to the keyboard 14 as discussed below. Thus, the circuitry depicted in FIG. 4G allows the mode switch 20 to be actuated by a user to couple the keyboard 14 to either the first P.C. 22 or the second P.C. 24 even though the microcontroller 100 is down. Further, because the keyboard is powered by VCLA from the P.C.'s power supply, the TDD device 10 can function as an operable P.C. keyboard, even though the microcontroller 100 of the device 10 is down.

Figure 5:
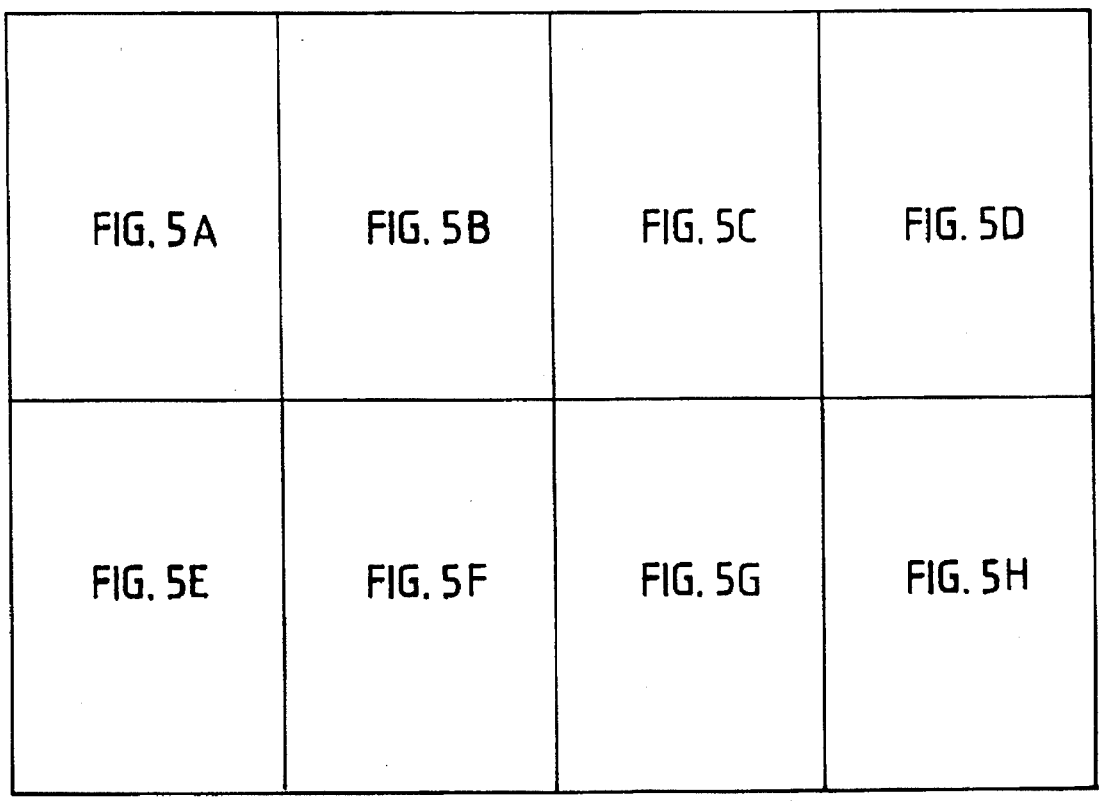
FIG. 5 is a plan view illustrating the interconnection of FIGS. 5A-5H.
Figure 5A:
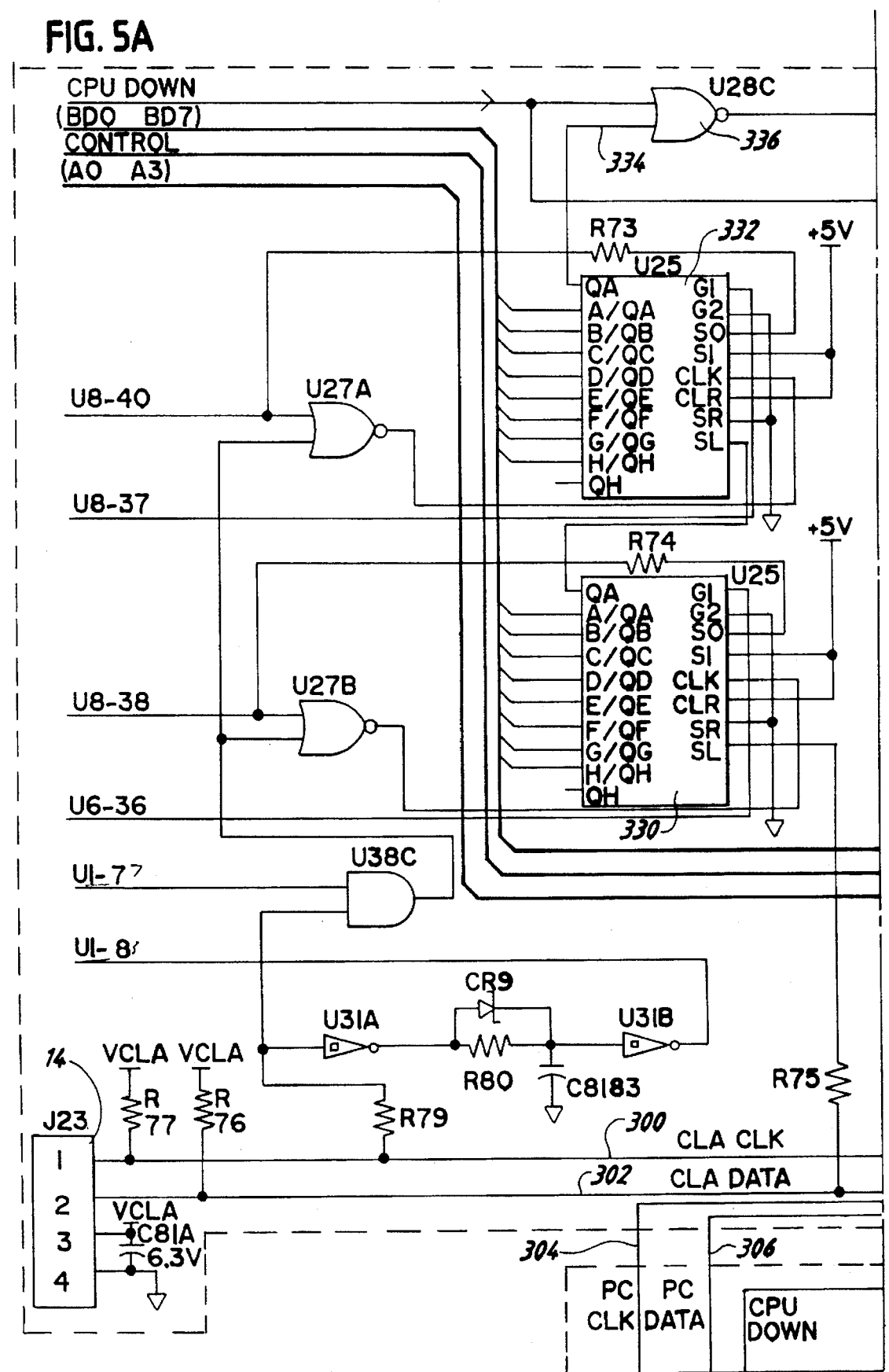
Figure 5B:
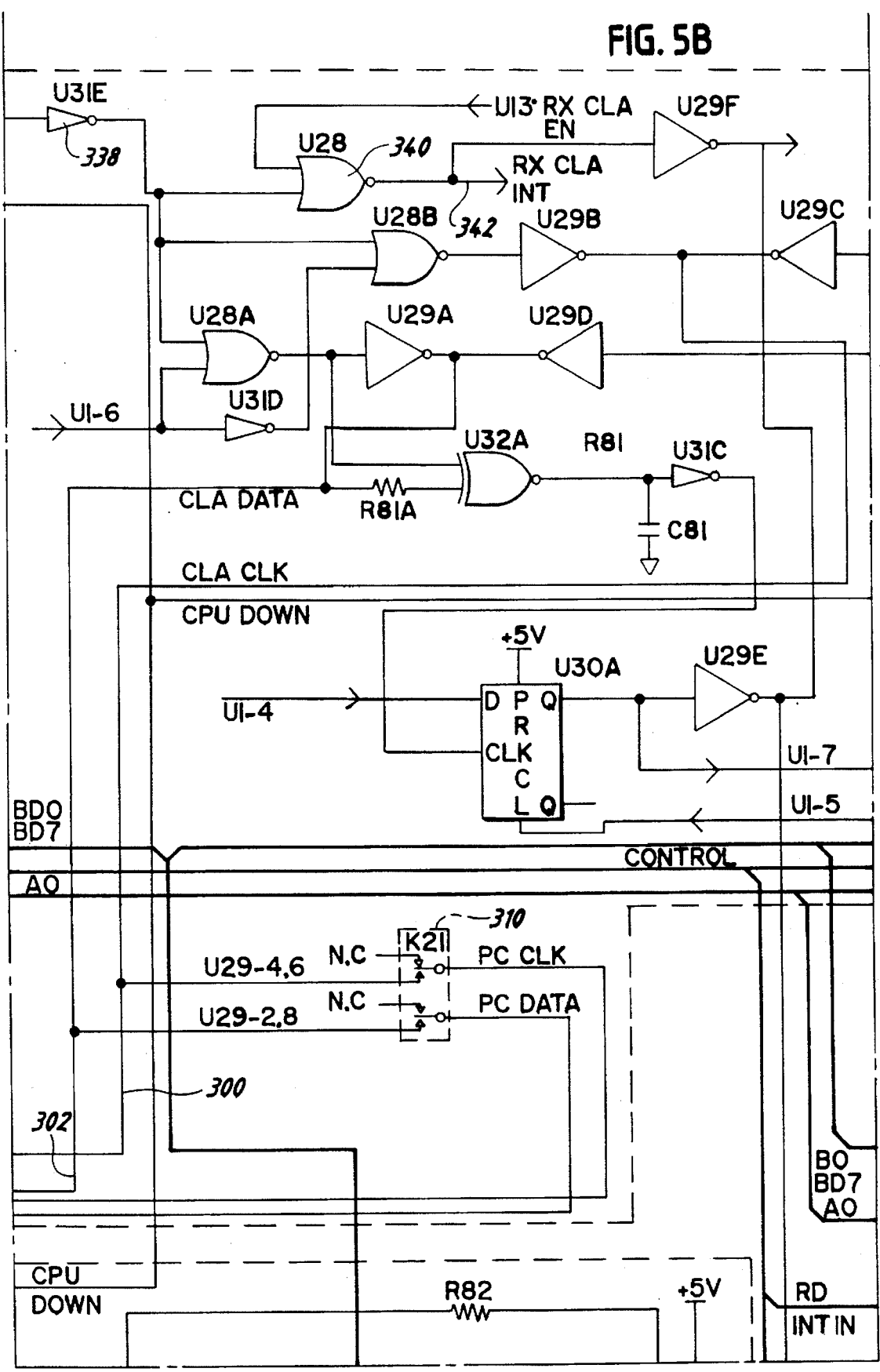
Figure 5C:
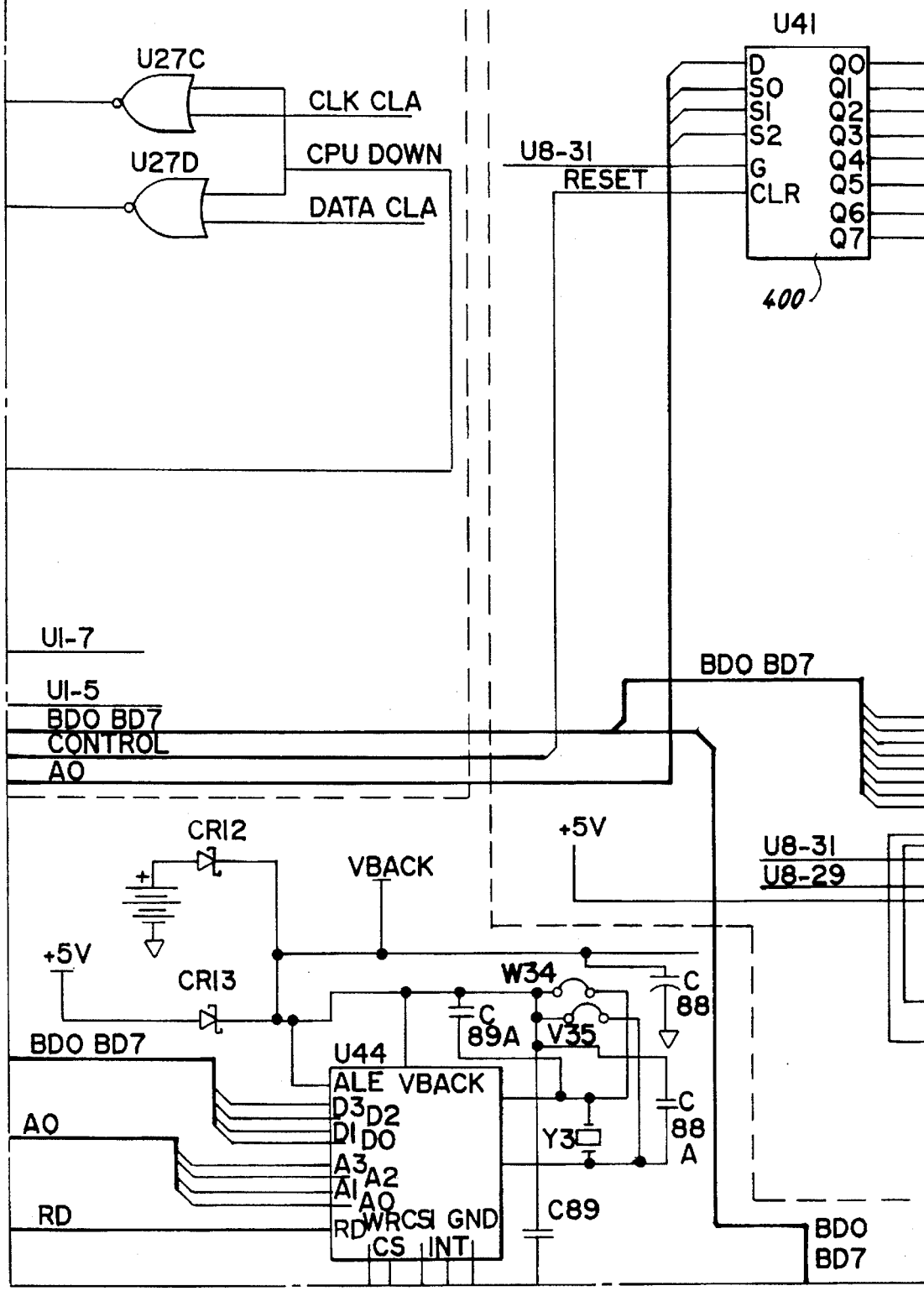
Figure 5D:
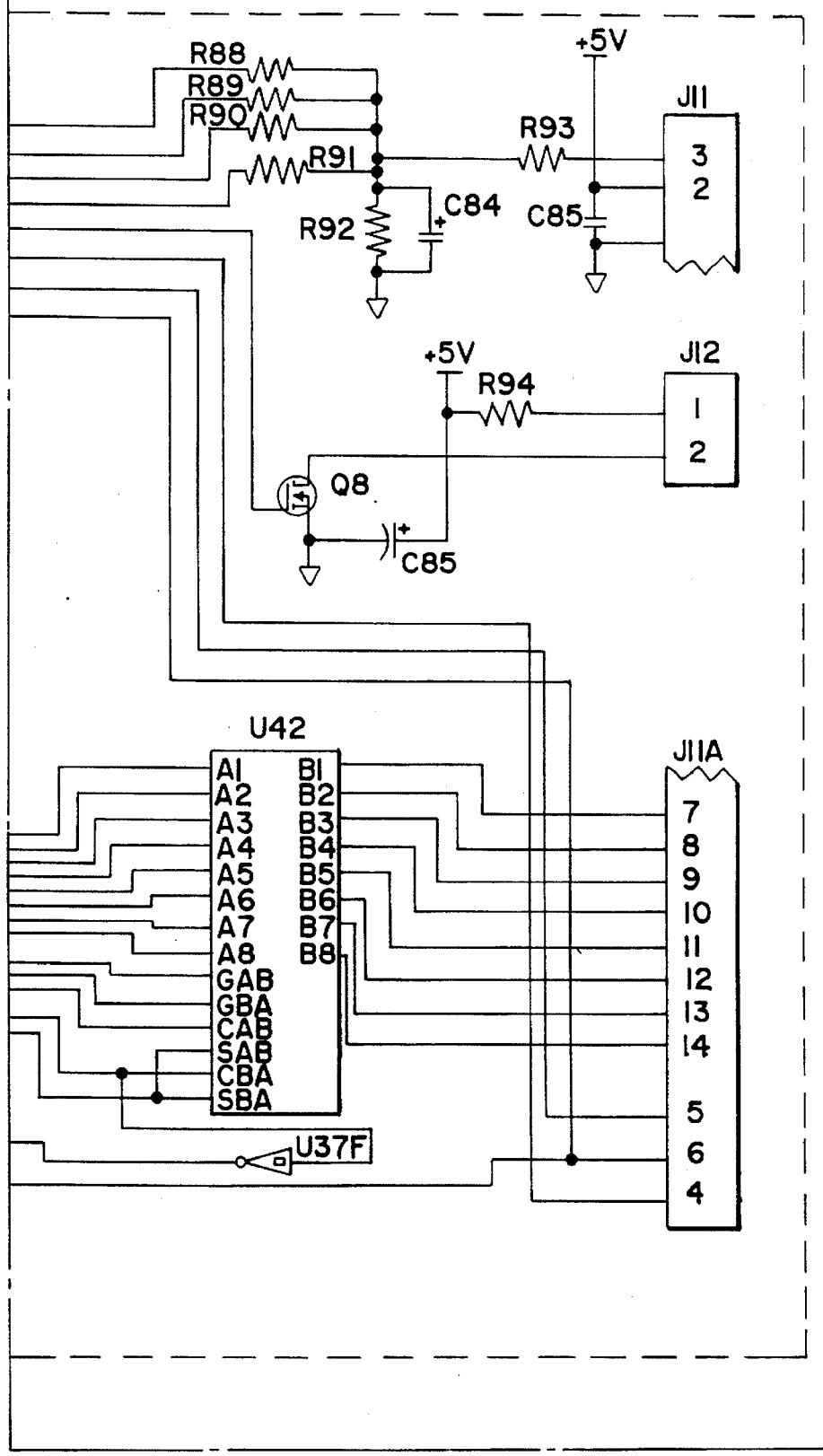
Figure 5E:
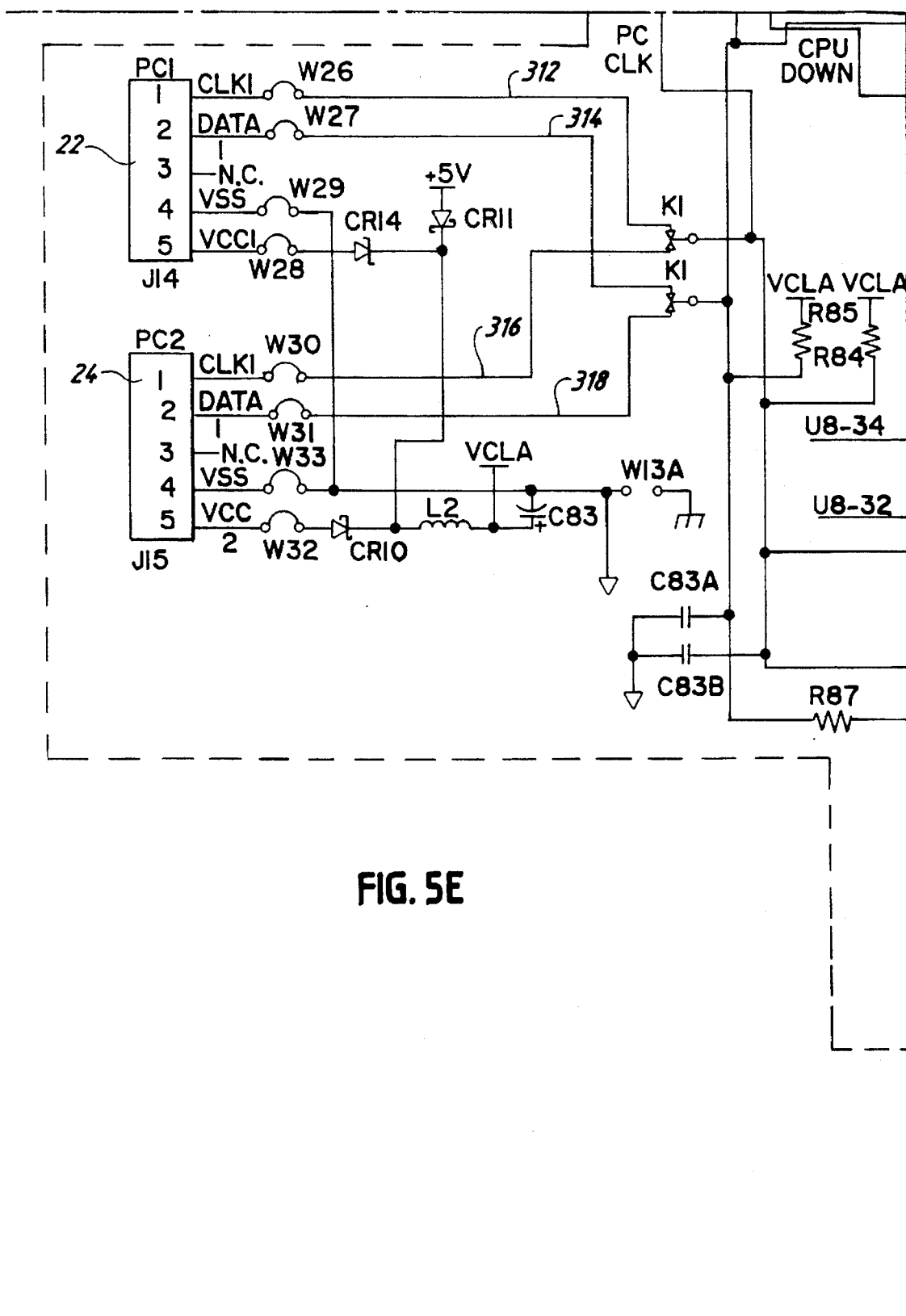
Figure 5F:
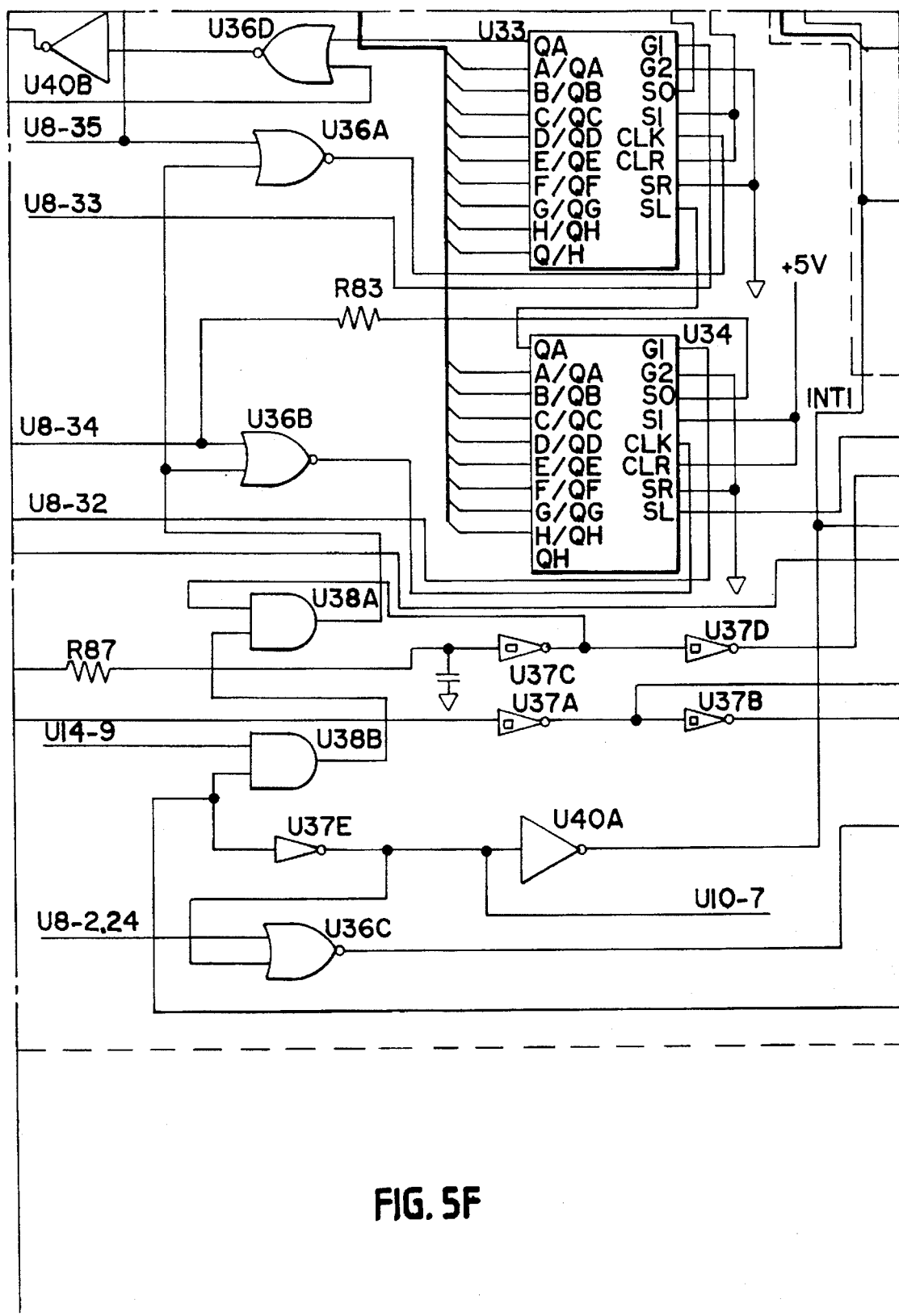
Figure 5G:
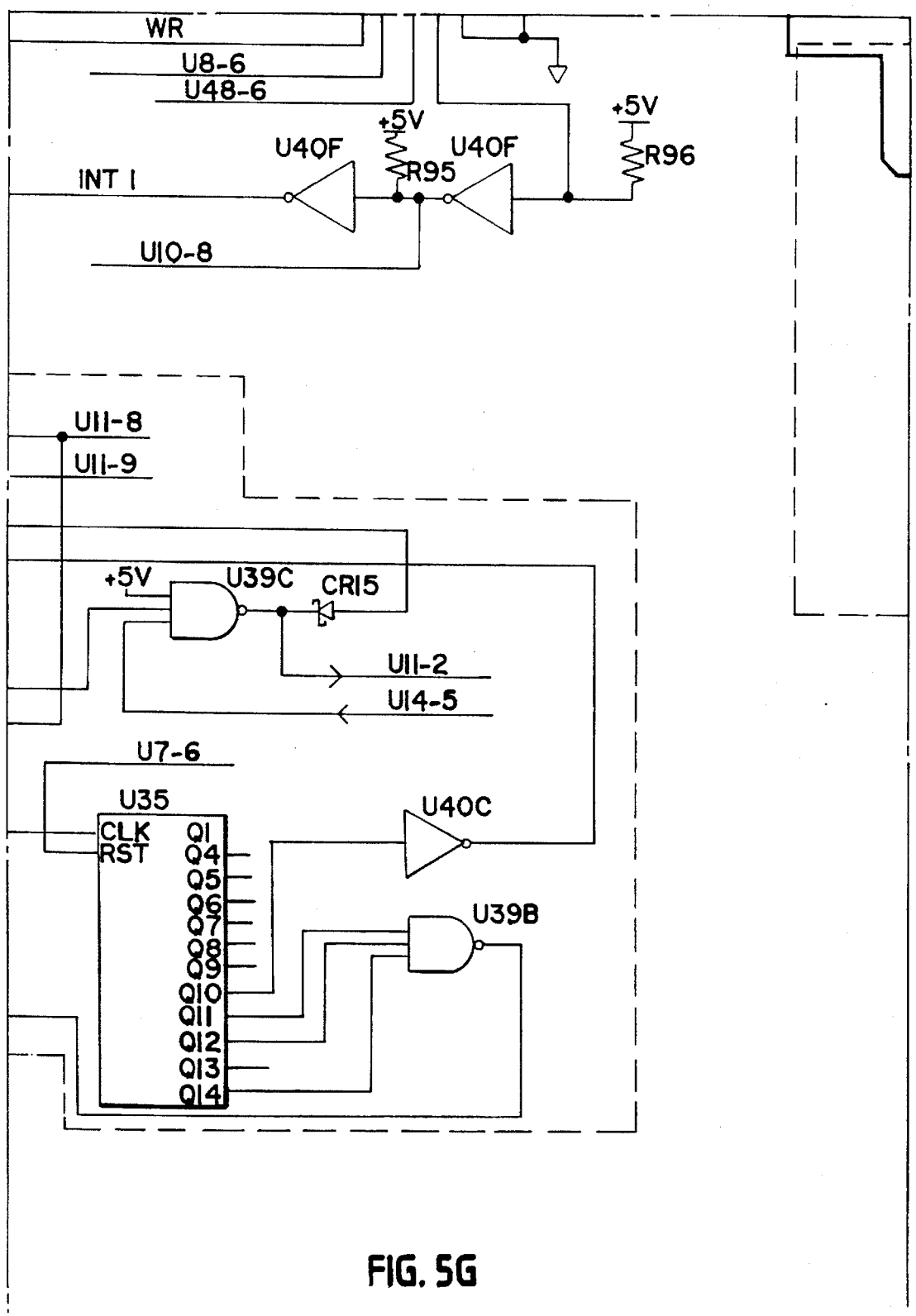

As shown in FIGS. 5A, 5B and 5E, the keyboard 14 has clock and data lines 300 and 302 that are coupled to the P.C. clock and data lines 304 and 306 through a K2 relay 310. The K2 relay 310 is normally closed so that the keyboard is coupled through the relay directly to either the first P.C. 22 or the second P.C. 24. The K2 relay 310 is opened by the microcontroller 100 via the CLABYPASS output from the latch 122 (FIG. 3G) when the device 10 is operated in a first TDD mode so that the keyboard inputs are not coupled to either the first P.C. 22 or the second P.C. 24. The P.C. clock and data lines 304 and 306 are coupled to the relay K1 which, depending upon the state thereof couples the keyboard inputs on the P.C. clock and P.C. data lines 304 and 306 to either the P.C. 22 on lines 312 and 314 or to the P.C. 24 on lines 316 and 318. The data from the keyboard 14 on line 302 is also coupled to a buffer 330 the overflow of which is coupled to a buffer 332. Serial data output from the buffer 332 on a line 334 is applied to a NOR gate 336 the output of which is coupled to an inverter 338 shown in FIG. 5B. The output of the inverter 338 is coupled to a NOR gate 340 which also receives an input RX CLA EN * from the microcontroller wherein the output of the NOR gate 340 is a signal, RX CLA INT that is coupled to the microcontroller to indicate that data has been received from the keyboard 14 so that the microcontroller can control the reading of the keyboard inputs for TDD communications.

Figure 5H:
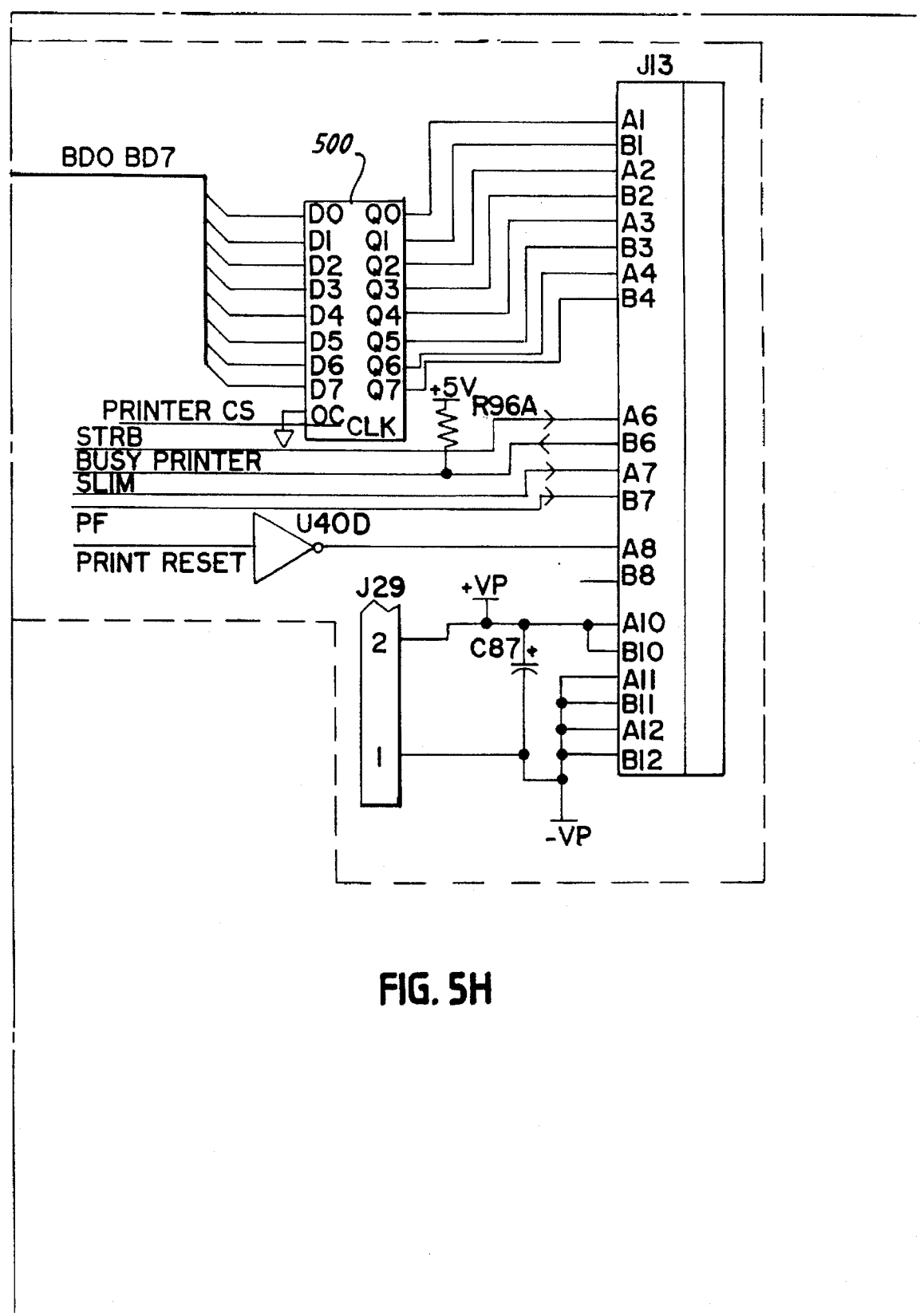

It is noted that the circuitry depicted in FIG. 5D along with the addressable latch 400 depicted in FIG. 5C is used to control the LCD display 16. Further, the printer 18 is coupled to the microcontroller via the circuitry depicted in FIG. 5H which includes a latch 500 coupled to the data bus BD0–BD7.

Many modifications and variations of the present invention are possible in light of the above teachings. Thus, it is to be understood that, within the scope of the appended claims, the invention may be practiced otherwise than as described hereinabove.

We claim:

1. A device operable as a standard keyboard for a computer and as a telecommunication device for the dear comprising:

a housing separate and apart from the computer;

a computer keyboard having alpha, numeric and function keys mounted on said housing, said keys being actuable to provide keyboard inputs;

a TDD communication interface for receiving telecommunications for the deaf from and transmitting telecommunications for the deaf to a telephone line, said interface being mounted in said housing;

a mode switch mounted on said housing, said mode switch being actuable to indicate operation of said device in a first mode and actuable to indicate operation of said device in a second mode; and a controller mounted in said housing and responsive to a mode switch indication of first mode operation to couple keyboard inputs to said TDD communication interface, said controller being responsive to a mode switch indication of second mode operation to couple keyboard inputs to said computer to allow a single device to operate as a TDD device and a computer keyboard.

2. A telecommunication device for the deaf that provides standard input for a computer as recited in claim 1 further including detecting means for detecting the receipt of a telecommunication from the deaf; and indicating means responsive to said detecting means for providing an indication to a user that a telecommunication from the deaf has been received regardless of the mode of operation of said device.

3. A telecommunication device for the deaf that provides standard input for a computer as recited in claim 2 wherein said indicating means includes a display mounted on said housing.

4. A telecommunication device for the deaf that provides standard input for a computer as recited in claim 3 wherein said controller controls said display to provide an indication of the mode of operation of said device.

5. A telecommunication device for the deaf that provides standard input for a computer as recited in claim 2 wherein said indicating means provides an audible indication of the receipt of a telecommunication from the deaf.

6. A telecommunication device for the deaf that provides standard input for a computer as recited in claim 1 wherein said mode switch is actuable by a user to indicate operation in a third mode, said controller being responsive to operation in said third mode to couple keyboard inputs to a second computer.

7. A telecommunication device for the deaf that provides standard input for a computer as recited in claim 6 wherein said device includes means operable when said controller is down to be responsive to actuations of said mode switch to switch between said second mode and said third mode.

8. A telecommunication device for the deaf that provides standard input for a computer as recited in claim 1 further including means for coupling said TDD interface to a mouthpiece connection and to an earpiece connection of a telephone handset.

9. A telecommunication device for the deaf that provides standard input for a computer as recited in claim 8 including a gain adjustment for said mouthpiece connection to accommodate various telephones.

10. A telecommunication device for the deaf that provides standard input for a computer as recited in claim 9 wherein said controller automatically disconnects the telephone's mouthpiece connection during a TDD transmission so that noise picked up by the mouthpiece of the telephone does not interfere with said TDD transmission.

11. A telecommunication device for the deaf that provides standard input for a computer as recited in claim 8 wherein said controller automatically attenuates the level of an incoming signal on said earpiece connection to mute the TDD communication as heard by a TDD operator.

12. A telecommunication device for the deaf that provides standard input for a computer as recited in claim 1 wherein said TDD communication interface includes a module for receiving and transmitting Baudot communications and a module for receiving and transmitting ASCII communications.

13. A telecommunication device for the deaf that provides standard input for a computer as recited in claim 1 wherein said controller includes a memory for storing data representing programmed TDD messages, each message being associated with one or more keys of said keyboard and said controller in said first mode being responsive to the actuation of said one or more keys to automatically couple the stored message associated with the actuated key to said TDD communication interface.

14. A device operable as a standard keyboard for a computer and as a telecommunication device for the deaf comprising:

a housing separate and apart from the computer;

a computer keyboard mounted in said housing, said keys being actuable to provide keyboard inputs;

a TDD communication interface for receiving telecommunications for the deaf from and for transmitting telecommunications for the deaf to a telephone line, said interface being mounted in said housing;

a mode switch actuable to indicate operation in a plurality of keyboard echo modes;

a controller mounted in said housing and responsive to one or more keyboard inputs and to a mode switch indication of a first mode of operation to control the application of data to said TDD communication interface for transmission of said data as a telecommunication for the deaf, said controller being responsive to a mode switch indication of a second mode of operation to couple keyboard inputs to said computer; and detecting means mounted in said housing for detecting the receipt of a TDD call regardless of the mode of operation.

15. A telecommunication device for the deaf that provides standard input for a computer as recited in claim 14 including indicating means responsive to said detecting means for providing an indication to a user that a telecommunication from the deaf has been received.

16. A telecommunication device for the deaf that provides standard input for a computer as recited in claim 15 wherein said indicating means includes a display mounted on said keyboard.

17. A telecommunication device for the deaf that provides standard input for a computer as recited in claim 16 wherein said controller controls said display to provide an indication of the mode of operation of said device.

18. A telecommunication device for the deaf that provides standard input for a computer as recited in claim 15 wherein said indicating means provides an audible indication of the receipt of a telecommunication from the deaf.

19. A telecommunication device for the deaf that provides standard input for a computer as recited in claim 14 wherein said mode switch is actuable by a user to indicate operation in a third mode, said controller being responsive to operation in said third mode to couple keyboard inputs to a second computer.

20. A telecommunication device for the deaf that provides standard input for a computer as recited in claim 19 wherein said device includes means operable when said controller is down to be responsive to actuations of said mode switch to switch between said second mode and said third mode.

21. A telecommunication device for the deaf that provides standard input for a computer as recited in claim 14 further including means for coupling said TDD interface to a mouthpiece connection and to an earpiece connection of a telephone handset.

22. A telecommunication device for the deaf that provides standard input for a computer as recited in claim 21 including a gain adjustment for said mouthpiece connection to accommodate various telephones.

23. A telecommunication device for the deaf that provides standard input for a computer as recited in claim 22 wherein said controller automatically disconnects the telephone's mouthpiece connection during a TDD transmission so that noise picked up by the mouthpiece of the telephone does not interfere with said TDD transmission.

24. A telecommunication device for the deaf that provides standard input for a computer as recited in claim 21 wherein said controller automatically attenuates the level of an incoming signal on said earpiece connection to mute the TDD communication as heard by a TDD operator.

25. A telecommunication device for the deaf that provides standard input for a computer as recited in claim 14 wherein said TDD communication interface includes a module for receiving and transmitting Baudot communications and a module for receiving and transmitting ASCII communications.

26. A telecommunication device for the deaf that provides standard input for a computer as recited in claim 14 wherein said controller includes a memory for storing data representing programmed TDD messages, each message being associated with one or more keys of said keyboard and said controller in said first mode being responsive to the actuation of said one or more keys to automatically couple the data representing the stored message associated with the actuated key to said TDD communication interface.

27. A device operable as a standard keyboard for a first computer and a second computer and as a telecommunication device for the deaf comprising:

a housing separate and apart from said first and second computers;

a computer keyboard mounted in said housing, said keys being actuable to provide keyboard inputs;

a TDD communication interface for receiving telecommunications for the deaf from and for transmitting telecommunications for the deaf to a telephone line, said interface being mounted in said housing;

a mode switch actuable to indicate operation in a plurality of keyboard echo modes;

a controller mounted in said housing and responsive to one or more keyboard inputs and to a mode switch indication of a first mode of operation to control the application of data to said TDD communication interface for transmission of said data as a telecommunication for the deaf, said controller being responsive to a mode switch indication of a second mode of operation to couple keyboard inputs to said first computer and said controller being responsive to a mode switch indication of a third mode of operation to couple keyboard inputs to said second computer; and means for bypassing said controller when said controller is inoperative to couple keyboard inputs to one of said first computer and said second computer.

28. A telecommunication device for the deaf that provides standard input for a computer as recited in claim 27 wherein said bypass means is responsive to said mode switch when said controller is down to couple keyboard inputs to a different one of said first and second computers.

\* \* \* \* \*